United States Patent
Niwa et al.

(10) Patent No.: US 10,572,420 B2
(45) Date of Patent: Feb. 25, 2020

(54) INFORMATION PROCESSING APPARATUS, INFORMATION PROCESSING PROGRAM, AND INFORMATION PROCESSING METHOD

(71) Applicant: OMRON Corporation, Kyoto-shi, Kyoto (JP)

(72) Inventors: Yoshimi Niwa, Kusatsu (JP); Takamasa Ueda, Kusatsu (JP); Katsuyuki Kawamata, Kusatsu (JP); Yuji Ikeo, Kusatsu (JP)

(73) Assignee: OMRON Corporation, Kyoto-shi (JP)

( * ) Notice: Subject to any disclaimer, the term of this patent is extended or adjusted under 35 U.S.C. 154(b) by 237 days.

(21) Appl. No.: 14/949,939

(22) Filed: Nov. 24, 2015

(65) Prior Publication Data
US 2016/0292110 A1 Oct. 6, 2016

(30) Foreign Application Priority Data
Mar. 31, 2015 (JP) .................................. 2015-073048

(51) Int. Cl.
G06F 13/362 (2006.01)
G05B 19/05 (2006.01)
G06F 13/42 (2006.01)

(52) U.S. Cl.
CPC ....... *G06F 13/3625* (2013.01); *G05B 19/054* (2013.01); *G06F 13/4282* (2013.01);
(Continued)

(58) Field of Classification Search
None
See application file for complete search history.

(56) References Cited

U.S. PATENT DOCUMENTS

2005/0201408 A1 9/2005 Otani et al.
2008/0013475 A1* 1/2008 Bandou .................... G05B 9/02
370/324
(Continued)

FOREIGN PATENT DOCUMENTS

CN 101477362 A 7/2009
CN 103576613 A 2/2014
(Continued)

OTHER PUBLICATIONS

Acromag, Introduction to Profibus DP, 2002 (Year: 2002).*
(Continued)

*Primary Examiner* — Rocio Del Mar Perez-Velez
*Assistant Examiner* — Hung H Dang
(74) *Attorney, Agent, or Firm* — Metrolex IP Law Group, PLLC

(57) ABSTRACT

A control system synchronizes input timing and output timing between functional units, while achieving the contradictory aspect of shortening the communication cycle of data frames transferred on a network. An information processing apparatus calculates parameters for the functional units included in a slave device in accordance with a mode selected from a plurality of available modes. The modes include a first mode in which timing to obtain a status value from the control target and timing to update an output value for the control target are synchronized between all the functional units included in the slave device, and a second mode in which the timing to obtain a status value from the control target and the timing to update an output value for the control target are synchronized between specific functional units included in the slave device.

13 Claims, 19 Drawing Sheets

(52) U.S. Cl.
CPC ............. *G05B 2219/1145* (2013.01); *G05B 2219/13063* (2013.01)

(56) References Cited

U.S. PATENT DOCUMENTS

| | | | | |
|---|---|---|---|---|
| 2008/0189458 | A1* | 8/2008 | Deshpande | G06F 13/4291 |
| | | | | 710/110 |
| 2008/0249641 | A1 | 10/2008 | Enver et al. | |
| 2013/0254584 | A1 | 9/2013 | Tamaoki | |
| 2014/0025185 | A1* | 1/2014 | Miyazaki | G05B 19/18 |
| | | | | 700/3 |
| 2014/0089717 | A1* | 3/2014 | Alsup | G06F 1/12 |
| | | | | 713/401 |
| 2015/0058502 | A1* | 2/2015 | Seki | G05B 19/05 |
| | | | | 710/19 |

FOREIGN PATENT DOCUMENTS

| | | | |
|---|---|---|---|
| CN | 104364721 | A | 2/2015 |
| JP | 2005-293569 | A | 10/2005 |
| JP | 2007-312043 | A | 11/2007 |
| JP | 2009-187152 | A | 8/2009 |
| JP | 2011-216085 | A | 10/2011 |
| JP | 2014-120884 | A | 6/2014 |
| WO | 2012-081115 | A1 | 6/2012 |

OTHER PUBLICATIONS

The Chinese office action dated Apr. 25, 2018 in a counterpart Chinese patent application.
The Japanese office action dated May 29, 2018 in a counterpart Japanese patent application.

* cited by examiner (i) Communication coupler in remote IO terminal (ii) Functional unit (i) Communication coupler in remote IO terminal

FIG. 15A
| Type | Input-output sync | Input priority/Output priority |
|---|---|---|
| AA | ○ | ○ |
| AB | ○ | — |
| AC | ○ | ○ |
FIG. 15B
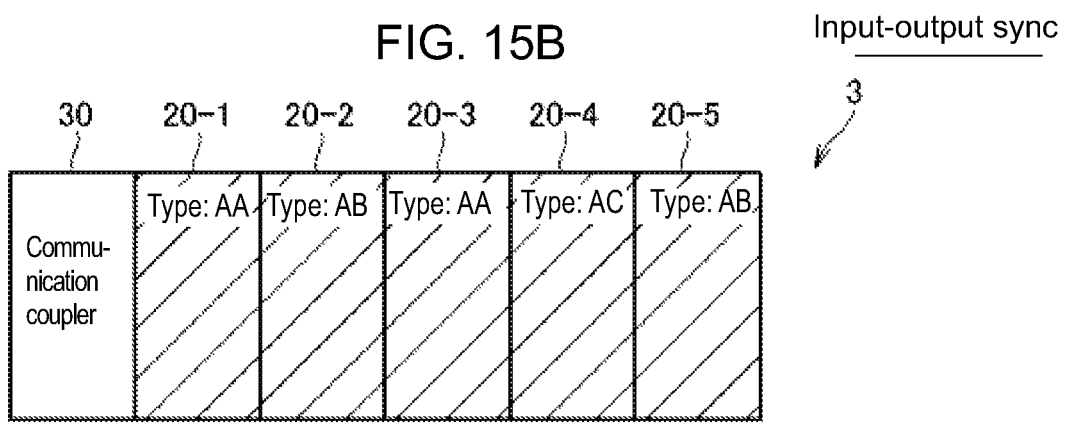
FIG. 15C
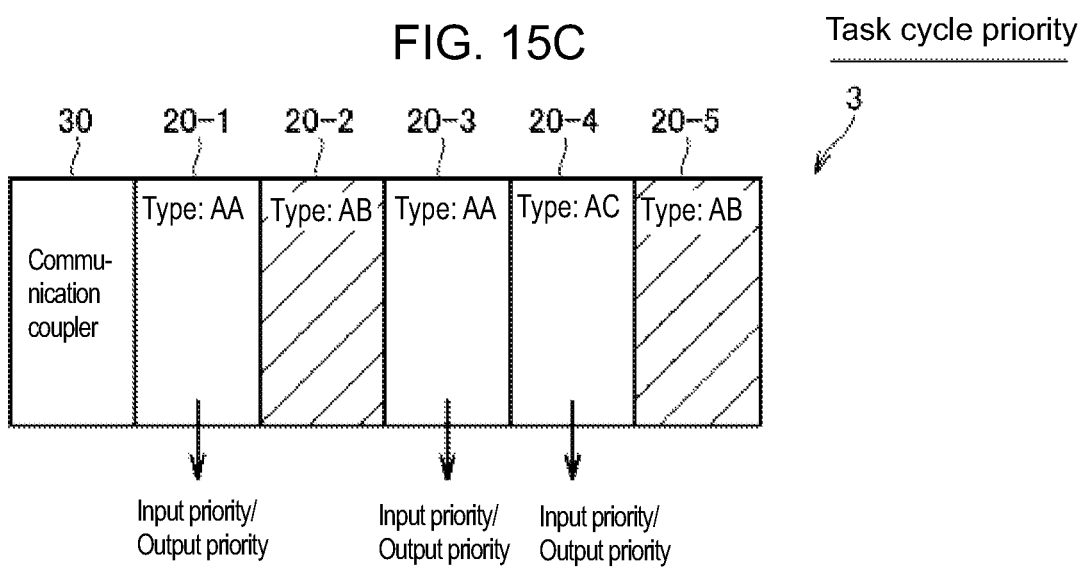

INFORMATION PROCESSING APPARATUS, INFORMATION PROCESSING PROGRAM, AND INFORMATION PROCESSING METHOD

FIELD

The present invention relates to an information processing apparatus, an information processing program, and information processing method for setting parameters to be used in a control system that controls the operations of machines or devices.

BACKGROUND

Machines or devices used at many production sites are typically controlled by control systems including controllers, such as programmable logic controllers (PLCs). Each PLC in the control system includes a central processing unit (CPU) module and functional units such as an input-output (IO) unit that receives an input signal from an external switch or a sensor and/or outputs a signal to an external relay or an actuator. The PLC may be connected to one or more remote IO terminals via a network. Each of the remote IO terminals includes a communication coupler and one or more functional units.

The PLC may communicate with one or more remote IO terminals using polling in which the PLC functions as a master for managing the entire communication. For example, Japanese Unexamined Patent Application Publication No. 2007-312043 (Patent Literature 1) describes two typical modes of communication between a master and slaves in a remote IO system, namely, broadcasting and polling. Broadcasting is a communication mode in which the master station simultaneously transmits signals to all the slave stations. Polling is a communication mode in which the master station obtains identification information of target slave stations, such as their addresses, and transmits signals to the target slave stations by designating the target slave stations.

CITATION LIST

Patent Literature

Patent Literature 1: Japanese Unexamined Patent Application Publication No. 2007-312043

SUMMARY

Technical Problem

When, for example, a control target is controlled, a plurality of status values obtained from the same control target are to be synchronized. More specifically, the status values are to be obtained from the control target at the same timing. The obtained status values may then be used to calculate output values for the control target.

The status values obtained from different remote IO terminals connected to each other via a network may fail to be synchronized easily because transfer delays occur between the remote IO terminals. In one communication mode, for example, data frames may be transferred sequentially, and remote IO terminals may transmit and receive data between them. In this communication mode, each data frame may reach different remote IO terminals at different timing. The timing to obtain a status value (input refresh) and the timing to update an output value (output refresh) are to be adjusted for each remote IO terminal in accordance with the timing at which the data frame reaches each remote IO terminal.

The timing is adjusted between the remote IO terminals. However, the responsiveness also differs between different functional units. To synchronize (lock) the timing to obtain status values (input refresh) and the timing to update output values (output refresh) between all the functional units connected to each remote IO terminal, the timing for every function unit is to be adjusted to the timing for the functional unit with the lowest responsiveness. In this case, the communication cycle of data frames cannot be shortened.

One or more aspects of the present invention are directed to a technique used in a control system including a master device and one or more slave devices connected to the master device via a network for synchronizing the input timing and the output timing between a plurality of functional units, while achieving the contradictory aspect of shortening the communication cycle of data frames transferred on the network.

Solution to Problem

A first aspect of the present invention provides an information processing apparatus for setting parameters to be used in a control system. The control system includes a master device and one or more slave devices connected to the master device via a network. Each slave device includes one or more functional units that transmit and receive a signal to and from a control target. The information processing apparatus includes a calculation unit that calculates parameters for the functional units included in each slave device in accordance with a mode selected from a plurality of available modes, and a setting unit that sets the calculated parameters in the control system. The plurality of modes include a first mode in which timing to obtain a status value from the control target and timing to update an output value for the control target are synchronized between all the functional units included in the slave device, and a second mode in which the timing to obtain a status value from the control target and the timing to update an output value for the control target are synchronized between specific functional units included in the slave device.

In some embodiments, in the second mode, the timing to obtain a status value from the control target or the timing to update an output value for the control target is synchronized between functional units other than the specific functional units included in the slave device.

In some embodiments, in the second mode, the timing to obtain a status value from the control target and the timing to update an output value for the control target are synchronized between the specific functional units, and the timing to obtain a status value from the control target and the timing to update an output value for the control target are synchronized between functional units other than the specific functional units included in the slave device, independently of the specific functional units.

In some embodiments, the information processing apparatus further includes a selection reception unit that receives a selection of the specific functional units from the functional units included in the slave device.

In some embodiments, the master device includes one or more functional units that transmit and receive a signal to and from a control target. The calculation unit calculates parameters for the functional units included in the master device in accordance with a mode selected from the plurality of modes. The plurality of modes further include a mode in which the timing to obtain a status value from the control target and the timing to update an output value for the control target are synchronized between all the functional units included in the master device, and a mode in which the timing to obtain a status value from the control target and the timing to update an output value for the control target are synchronized between specific functional units included in the master device.

In some embodiments, the information processing apparatus further includes an identification unit, a first obtaining unit, a second obtaining unit, a third obtaining unit, and a determination unit. The identification unit identifies target functional units for which the timing to obtain a status value from the control target and the timing to update an output value for the control target are to be synchronized. The first obtaining unit obtains a first estimated time for a data frame transmitted on the network in a predetermined communication cycle. The first estimated time is a time taken from when the master device transmits the data frame to when the slave device completely receives the data frame. The second obtaining unit obtains a second estimated time. The second estimated time is a time taken from when the slave device completely receives the data frame to when the slave device completely transfers data included in the received data frame to all the target functional units. The third obtaining unit obtains a third estimated time. The third estimated time is a time taken by all the target functional units included in the slave device to be ready to transmit a status value obtained from the control target via the network. The determination unit determines, for each target functional unit, timing to start obtaining the status value from the control target within the communication cycle and timing to output the data included in the received data frame to the control target within the communication cycle based on the first to third estimated times.

A second aspect of the invention provides an information processing program enabling a computer to perform processing for setting parameters to be used in a control system. The control system includes a master device and one or more slave devices connected to the master device via a network. Each slave device includes one or more functional units configured to transmit and receive a signal to and from a control target. The information processing program enables the computer to implement calculating parameters for the functional units included in each slave device in accordance with a mode selected from a plurality of available modes, and setting the calculated parameters in the control system. The plurality of modes include a first mode in which timing to obtain a status value from the control target and timing to update an output value for the control target are synchronized between all the functional units included in the slave device, and a second mode in which the timing to obtain a status value from the control target and the timing to update an output value for the control target are synchronized between specific functional units included in the slave device.

A third aspect of the invention provides an information processing method for setting parameters to be used in a control system. The control system includes a master device and one or more slave devices connected to the master device via a network. Each slave device includes one or more functional units configured to transmit and receive a signal to and from a control target. The information processing method includes calculating parameters for the functional units included in each slave device in accordance with a mode selected from a plurality of available modes, and setting the calculated parameters in the control system. The plurality of modes include a first mode in which timing to obtain a status value from the control target and timing to update an output value for the control target are synchronized between all the functional units included in the slave device, and a second mode in which the timing to obtain a status value from the control target and the timing to update an output value for the control target are synchronized between specific functional units included in the slave device.

Advantageous Effects

The control system including a master device and one or more slave devices connected to the master device via a network according to one or more embodiments of the present invention synchronizes the input timing and the output timing between a plurality of functional units, while achieving the contradictory aspect of shortening of the communication cycle of data frames transferred on the network.

BRIEF DESCRIPTION OF THE DRAWINGS

FIGS. 15A to 15C are schematic diagrams showing a method for selectively setting the input-output synchronization mode of the control system according to the embodiment of the present invention.

DETAILED DESCRIPTION

Figure 1:
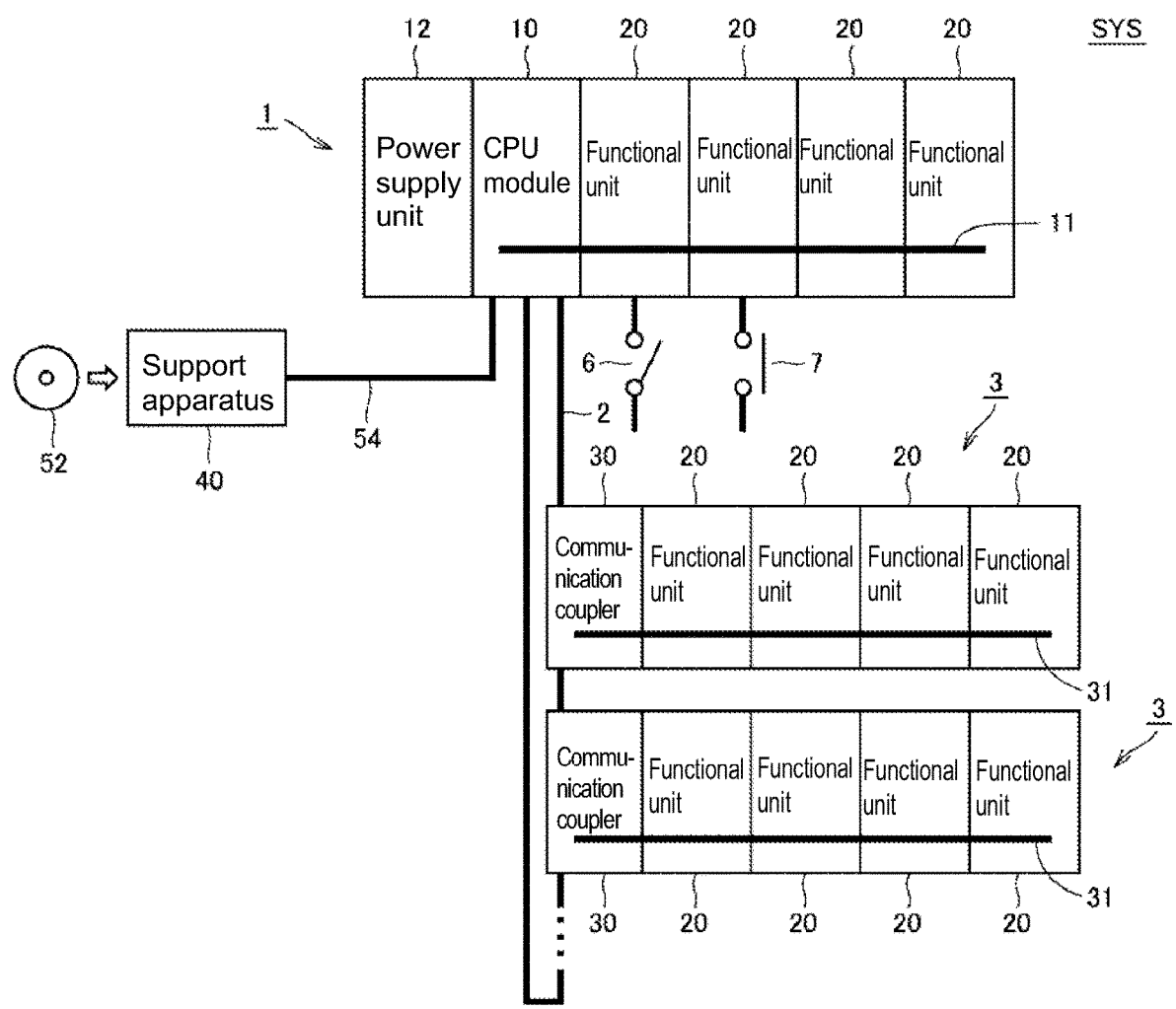
FIG. 1 is a schematic diagram showing the configuration of a control system according to one embodiment of the present invention.

Embodiments of the present invention will now be described with reference to the drawings. The same or corresponding components in the figures are given the same reference numerals, and will not be described repeatedly.

A. Configuration of Control System

The configuration of a control system according to one embodiment of the present invention will now be described. FIG. 1 is a schematic diagram showing the configuration of a control system SYS according to one embodiment of the present invention. Referring to FIG. 1, the control system SYS includes a programmable logic controller (PLC) 1, and one or more remote IO terminals 3 connected to the PLC 1 via a field network 2, which is an upper communication network. The PLC 1 is connected to a support apparatus 40 with, for example, a connection cable 54.

The PLC 1 includes a CPU module 10, which is responsible for main computation, and one or more functional units 20. These functional units 20 can transmit and receive data between them via an internal bus 11. The functional units 20 receive an appropriate voltage provided from a power supply unit 12. These functional units 20 include an IO unit and a special unit.

The IO unit performs typical input and output processing. The IO unit receives or outputs binary data, such as data with the on or off state. The IO unit obtains information indicating whether a sensor, such as a detection switch 6, has detected an object (on-state) or has detected no object (off-state). The IO unit also transmits an activation command (on) or a deactivation command (off) to a designated unit, such as a relay 7 or an actuator.

The special unit has functions that are not supported by the IO unit, such as input and output of analogue data, temperature control, PID control, a pulse counter, servo control, inverter control, and communication with a specific communication scheme (e.g., serial communication or encoder input).

The field network 2 can carry various data, which is transmitted to and received from the CPU module 10. The field network 2 may be industrial Ethernet (registered trademark). Variants of industrial Ethernet (registered trademark) include EtherCAT (registered trademark), Profinet IRT, MECHATROLINK (registered trademark)-III, Powerlink, SERCOS (registered trademark)-III, and CIP Motion. A field network other than industrial Ethernet (registered trademark) may be used. For example, DeviceNet or CompoNet/IP (registered trademark) may be used.

In the present embodiment, data frames may be sequentially transferred on the field network 2 to allow data to be transmitted and received between the PLC 1 and each remote IO terminal 3 or between the plurality of remote IO terminals 3. Hereafter, a data frame transferred on the field network 2 may also be referred to as an upper data frame to distinguish it from a data frame transferred on the internal bus.

One or more remote IO terminals 3 are further connected to the field network 2 in the control system SYS shown in FIG. 1. Each remote IO terminal 3 is used to arrange a functional unit 20 mounted on the PLC 1 at an extended position different from the position of the PLC 1. More specifically, each remote IO terminal 3 includes a communication coupler 30, which performs processing associated with data transfer via the field network 2, and one or more functional units 20. In other words, each remote IO terminal 3 includes one or more functional units 20 that transmit and receive a signal to and from a control target. The functional units 20 can transmit and receive data between them via an internal bus 31.

The communication coupler 30 controls the operations of the functional units 20, and further controls data transfer to and from the CPU module 10. The communication coupler 30 is connected to the CPU module 10 included in the PLC 1 via the field network 2.

The communication coupler 30 included in each remote IO terminal 3 centrally manages data transfer via the internal bus 31 between the functional units 20 (e.g., the IO unit or the special unit) to be mounted.

The PLC 1 (more specifically, the CPU module 10) centrally manages data transfer via the field network 2. The PLC 1 (more specifically, the CPU module 10) having this function may be referred to as a master device. The other remote IO terminals 3 (more specifically, the communication couplers 30) may be referred to as slave devices. In other words, the control system SYS includes a master device (the PLC 1) and one or more slave devices (the remote IO terminals 3), which are connected to the master device via with the network. In addition to such remote IO terminals 3, the system may further include, as slave devices, servo drivers that are directly connected to the field network 2. In some embodiments, a plurality of PLCs 1 are connected to the field network 2. In this case, one PLC 1 may serve as a master device, and the remaining PLCs 1 may serve as slave devices. In some embodiments, a controller different from the PLC 1 or from each of the remote IO terminals 3 may serve as a master device.

In other words, the terms "master device" and "slave device" intend to focus on the control function of data transfer on the field network 2, and will neither limit the information transmitted and received between the functional units nor limit the control targets.

B. Hardware Configuration of Remote IO Terminal 3

The hardware configuration of the remote IO terminal 3 included in the control system SYS according to the present embodiment will now be described.

b1. Connection

Figure 2:
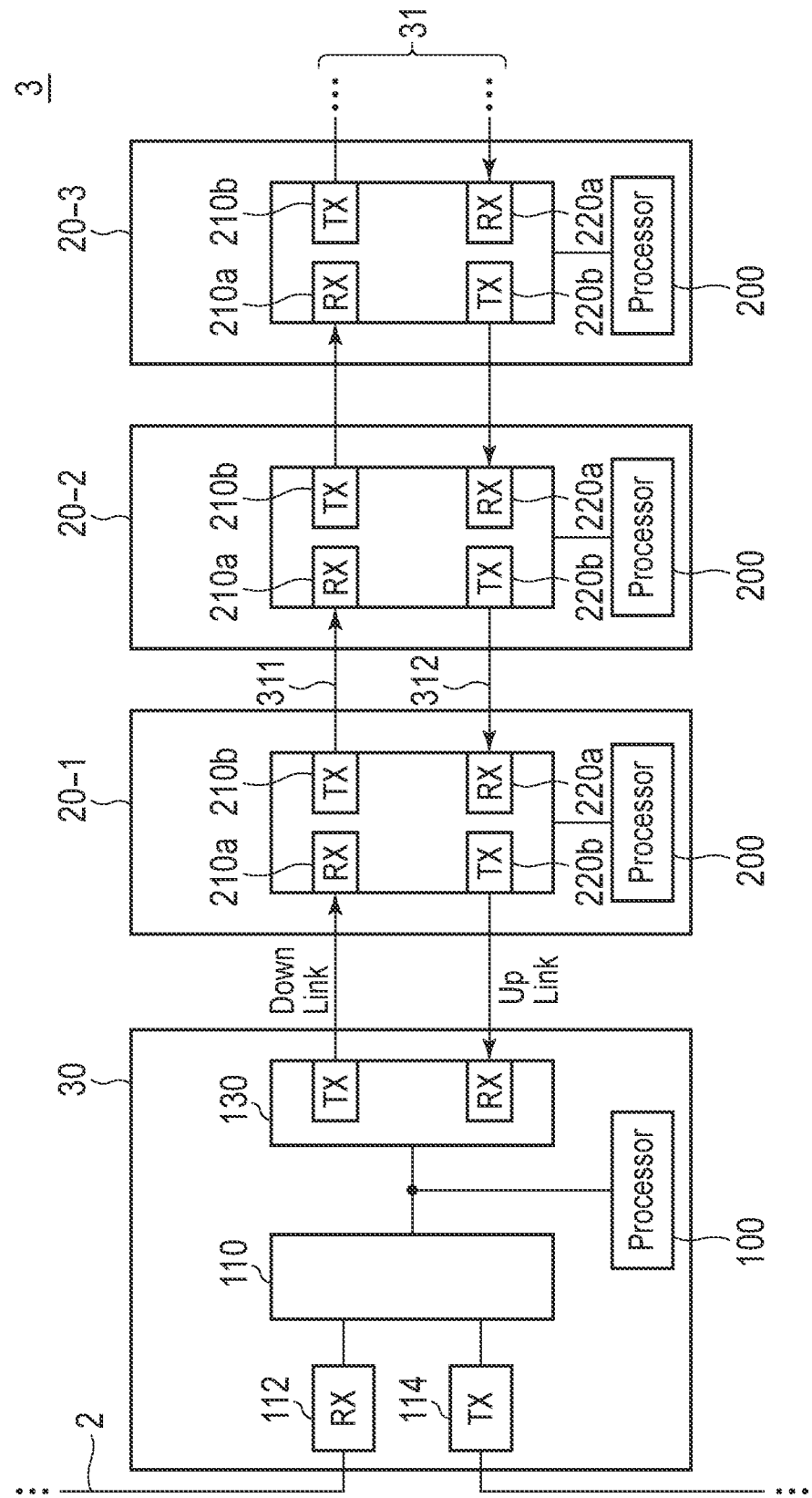
FIG. 2 is a schematic diagram showing the connection between remote IO terminals in the embodiment of the present invention.

FIG. 2 is a schematic diagram showing the connection in the remote IO terminal 3 according to the present embodiment. As shown in FIG. 2, the remote IO terminal 2 includes one or more functional units 20-1, 20-2, 20-3, . . . , which can transfer data to and from the communication coupler 30 via the internal bus 31 (including a downlink 311 and an uplink 312). The internal bus 31 serves as a communication line.

In one example, the downlink 311 and the uplink 312 use serial communication, and thus carry target data as time-series data. More specifically, data on the downlink 311 is transmitted in one direction from the communication coupler 30 toward the corresponding functional unit 20, whereas data on the uplink 312 is transmitted in one direction from one of the functional units 20 to the communication coupler 30.

When receiving a data frame transmitted on either the downlink 311 or the uplink 312, each functional unit 20 decodes the data stored in the data frame and subjects the obtained data to intended processing. Each functional unit 20 reconstructs the data frame, and retransmits (forwards) the data frame to the subsequent functional unit 20. Hereafter, a data frame including a status value to be output from each functional unit 20 may be referred to as an internal bus OUT frame, and a data frame including a status value obtained by each functional unit 20 may be referred to as an internal bus IN frame to distinguish these data frames from a data frame transmitted on the field network 2 (upper data frame). Basically, the internal bus OUT frame is transmitted on the downlink 311, and the internal bus IN frame is transmitted on the uplink 312. The internal bus OUT frame and the internal bus IN frame may be collectively referred to as internal bus frames.

To allow sequential transfer of such data frames (internal bus frames), each functional unit 20 includes a reception unit (hereafter, RX) 210a and a transmission unit (hereafter, TX) 210b on the downlink 311, and a reception unit 220a and a transmission unit 220b on the uplink 312. The reception units 210a and 220a of each functional unit 20 receive data included in an internal bus frame from other functional units 20 via the internal bus 31, which is a communication line. The transmission units 210b and 220b of each functional unit 20 transmit an internal bus frame including data to other functional units 20 via the internal bus 31, which is a communication line.

Each functional unit 20 includes a processor 200, which controls the above data processing.

The communication coupler 30 includes a processor 100, which is responsible for main computation, a field network controller 110, a reception unit 112, a transmission unit 114, and an internal bus controller 130. More specifically, the communication coupler 30, which is connected to the internal bus 31 (the downlink 311 and the uplink 312), is also connected to the field network 2 via the reception unit 112 and the transmission unit 114. The field network controller 110 controls data transfer via the field network 2. The internal bus controller 130 controls data transfer via the internal bus 31.

b2. Configuration of Communication Coupler 30

Figure 3:
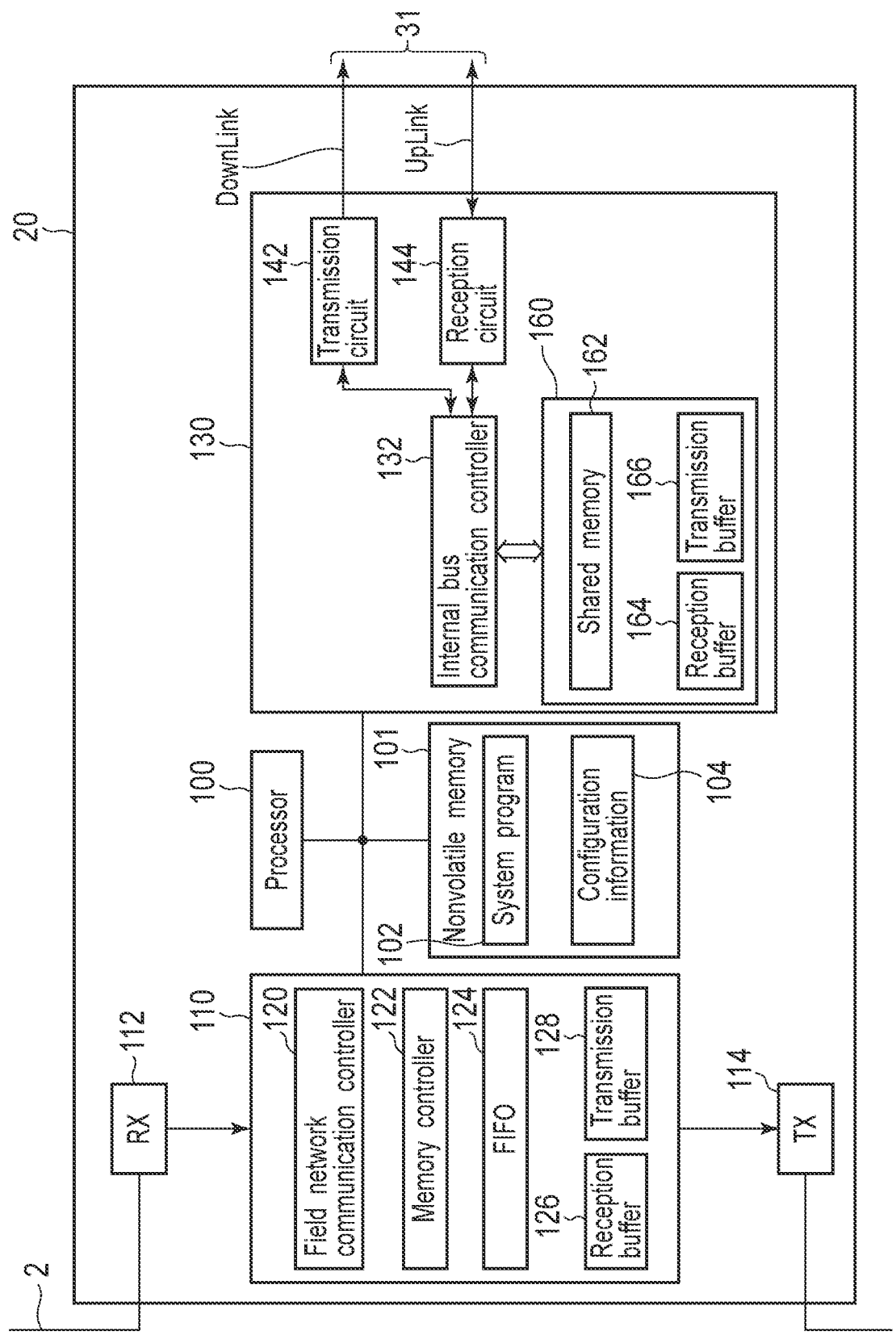
FIG. 3 is a schematic diagram showing the hardware configuration of a communication coupler included in each remote IO terminal in the embodiment of the present invention.

FIG. 3 is a schematic diagram showing the hardware configuration of the communication coupler 30 included in each remote IO terminal 3 according to the present embodiment. As shown in FIG. 3, the communication coupler 30 included in each remote IO terminal 3 includes a processor 100, a nonvolatile memory 101, a field network controller 110, a reception unit 112, a transmission unit 114, and an internal bus controller 130.

The reception unit 112 receives an upper data frame transmitted from the PLC 1 via the field network 2, decodes the data, and transmits the resultant data to the field network controller 110. The transmission unit 114 reconstructs the upper data frame using the data output from the field network controller 110, and then retransmits (forwards) the data frame via the field network 2.

The field network controller 110 transmits and receives an upper data frame via the field network 2 in every predetermined transfer cycle in cooperation with the reception unit 112 and the transmission unit 114. More specifically, the field network controller 110 includes a field-network communication controller 120, a memory controller 122, a first-in first-out (FIFO) memory 124, a reception buffer 126, and a transmission buffer 128.

The field network communication controller 120 may interpret a command transmitted from the PLC 1 via the field network 2, and perform processing for communication via the field network 2. The field network communication controller 120 copies data from upper data frames that are stored sequentially into the FIFO memory 124, and writes data into the upper data frames.

The memory controller 122 is a control circuit that enables functions including direct memory access (DMA). The memory controller 122 controls writing and reading of data to and from the FIFO memory 124, the reception buffer 126, and the transmission buffer 128.

The FIFO memory 124 temporarily stores upper data frames received via the field network 2, and sequentially outputs the upper data frames in the order in which they are stored. The reception buffer 126 extracts data showing the status value to be output from the output unit of each functional unit 20 mounted on the controller from the data contained in the upper data frames stored sequentially in the FIFO memory 124, and temporarily stores the extracted data. The transmission buffer 128 temporarily stores process data showing the status value detected by the input unit of the functional unit 20 and to be written into predetermined areas of upper data frames that are sequentially stored into the FIFO memory 124.

The processor 100 provides an instruction to the field network controller 110 and the internal bus controller 130, and may control data transfer between the field network controller 110 and the internal bus controller 130.

The nonvolatile memory 101 stores a system program 102 and configuration information 104. The configuration information 104 includes setup information associated with the functional unit 20.

The internal bus controller 130 transmits and receives internal bus frames (data) to and from the functional unit 20 with the internal bus 31 (the downlink 311 and the uplink 312).

More specifically, the internal bus controller 130 includes an internal bus communication controller 132, a transmission circuit 142, a reception circuit 144, and a storage unit 160.

The internal bus communication controller 132 centrally controls data transfer via the internal bus 31. The transmission circuit 142 generates internal bus frames that are transferred on the downlink of the internal bus 31, and transmits the generated frames in accordance with an instruction provided from the internal bus communication controller 132. The reception circuit 144 receives the internal bus frames that are transferred on the uplink of the internal bus 31, and outputs the received frames to the internal bus communication controller 132.

The storage unit 160 corresponds to a buffer memory for storing internal bus frames (data) transmitted on the internal bus 31. More specifically, the storage unit 160 includes a shared memory 162, a reception buffer 164, and a transmission buffer 166. The shared memory 162 temporarily stores internal bus frames transmitted and received between the field network controller 110 and the internal bus controller 130. The reception buffer 164 temporarily stores internal bus frames received from the functional unit 20 via the internal bus 31. The transmission buffer 166 temporarily stores data included in upper data frames received by the field network controller 110.

b3. Configuration of Functional Unit 20

Figure 4:
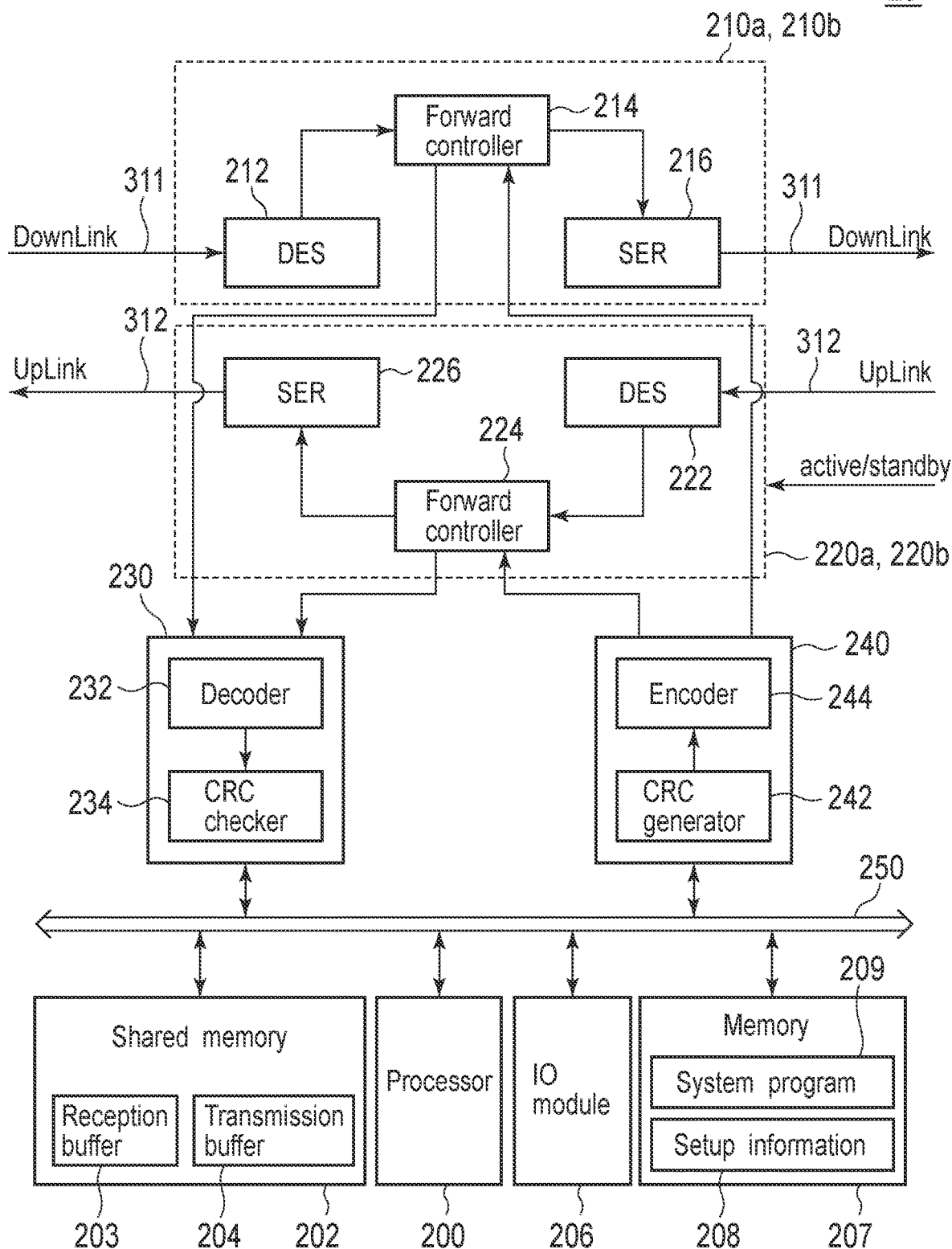
FIG. 4 is a schematic diagram showing the hardware configuration of a functional unit included in each remote IO terminal in the embodiment of the present invention.

FIG. 4 is a schematic diagram showing the hardware configuration of each functional unit 20 included in the remote IO terminal 3 according to the present embodiment. In FIG. 4, an IO unit is an example of the functional unit 20. Referring to FIG. 4, each functional unit 20 in the remote IO terminal 3 includes de-serializers (hereafter may be referred to as DES) 212 and 222, serializers (hereafter may be referred to as SER) 216 and 226, and forward controllers 214 and 224. Each functional unit 20 further includes a reception processing unit 230, a transmission processing unit 240, a processor 200, a shared memory 202, an IO module 206, and a memory 207, which are connected to one another with a bus 250.

The DES 212, the forward controller 214, and the SER 216 correspond to the reception unit 210a and the transmission unit 210b on the downlink 311 shown in FIG. 2. These components perform the processing for transmitting and receiving internal bus frames that are transferred on the downlink 311. In the same manner, the DES 222, the forward controller 224, and the SER 226 correspond to the reception unit 220a and the transmission unit 220b on the uplink 312 shown in FIG. 2. These components perform the processing for transmitting and receiving internal bus frames that are transferred on the uplink 312.

The reception processing unit 230 includes a decoder 232 and a CRC checker 234. The decoder 232 receives a data frame and decodes the data frame using to a predetermined algorithm to obtain data. The CRC checker 234 checks error correcting code such as cyclic redundancy check (CRC) using, for example, a frame check sequences (FCS) added at the end of the data frame.

The transmission processing unit 240 is connected to the forward controllers 214 and 224. In accordance with an instruction provided from the processor 200, the transmission processing unit 240 generates an internal bus frame to be retransmitted (forwarded) to the subsequent functional unit 20, and also controls timing to retransmit (forward) the internal bus frame. The transmission processing unit 240 also generates data to be transmitted to the subsequent functional unit 20 in cooperation with, for example, the processor 200. More specifically, the transmission processing unit 240 includes a CRC generator 242 and an encoder 244. The CRC generator 242 calculates a cyclic redundancy check (CRC) for data provided from, for example, the processor 200, and adds the obtained code to an internal bus frame storing the data. The encoder 244 encodes the data provided from the CRC generator 242, and outputs the encoded data to the corresponding forward controller 214 or 224.

The processor 200 is responsible for main computation, and centrally controls the functional unit 20. More specifically, the processor 200 stores a data frame received via the reception processing unit 230 into the shared memory 202, or reads predetermined data from the shared memory 202 and transmits the data to the transmission processing unit 240 to generate an internal bus frame.

The shared memory 202 includes a reception buffer 203, which temporarily stores an internal bus frame received via the reception processing unit 230, and a transmission buffer 204, which temporarily stores an internal bus frame to be transmitted via the transmission processing unit 240. The shared memory 202 further includes an area for storing various data.

The IO module 206 receives an input signal from an external switch or sensor, and writes the signal value into the shared memory 202, and/or outputs the received signal to an external relay or actuator in accordance with the signal value written in the corresponding area of the shared memory 202.

The memory 207 stores a system program 209 and setup information 208. Typically, the system program 209 is stored in a nonvolatile area of the memory 207, whereas the setup information 208 is stored in a volatile area of the memory 207.

C. Example Hardware Configuration of PLC 1

The CPU module 10 of the PLC 1 included in the control system SYS according to the present embodiment performs processing common to the system, IO refresh processing, and processing caused by a user program in every PLC control cycle. The user program typically includes a sequence program and a motion program. The sequence program is also referred to a ladder program, which is a logic set to determine one or more output values from one or more combinations of input signals. The motion program is a program to continuously control locations and speeds. The other hardware components of the PLC 1 are the same as the corresponding hardware components of the remote IO terminal 3 described above, and will not be described in detail.

D. Support Apparatus 40

The support apparatus 40 connected to the PLC 1 according to the present embodiment will now be described. The support apparatus 40 corresponds to an information processing apparatus for setting parameters to be used in the control system SYS.

Figure 5:
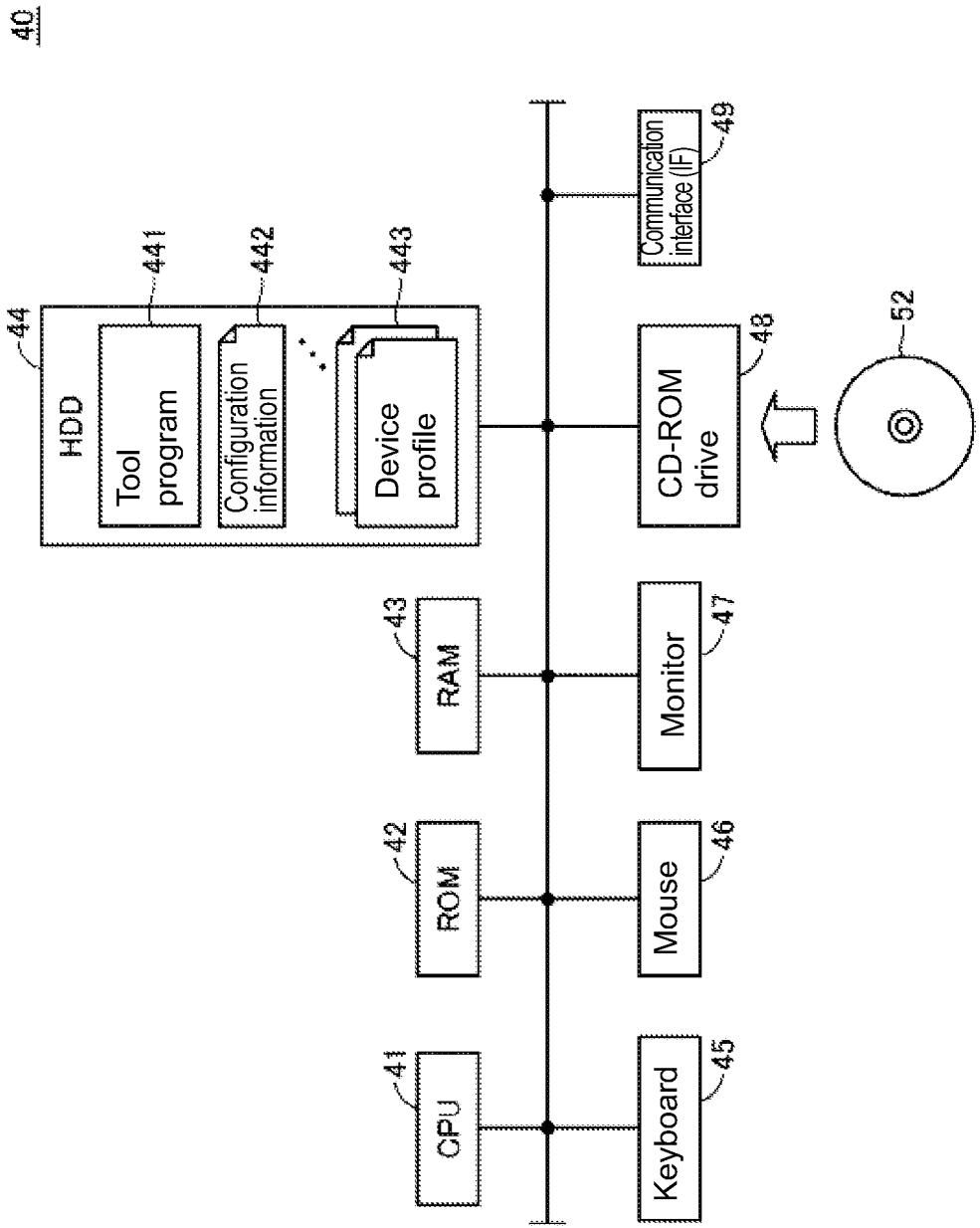
FIG. 5 is a schematic diagram showing the hardware configuration of a support apparatus connected to a PLC in the embodiment of the present invention.

FIG. 5 is a schematic diagram showing the hardware configuration of the support apparatus 40 connected to the PLC 1 according to the present embodiment. The support apparatus 40 is typically a general-purpose computer.

Referring now to FIG. 5, the support apparatus 40 includes a CPU 41, which executes various programs including an operating system (OS), a read-only memory (ROM) 42, which stores a basic input output system (BIOS) and various data, a memory RAM 43, which provides a work area for storing data when a program is executed by the CPU 41, a hard disk (HDD) 44, which stores programs to be executed by the CPU 41 in a nonvolatile manner. The hard disk 44 stores a tool program 441, configuration information 442, and device profiles 443.

The support apparatus 40 further includes a keyboard 45 and a mouse 46, which receive an operation performed by the user, and a monitor 47, which displays information to the user. The support apparatus 40 further includes a communication interface (IF) 49, which allows communication with, for example, the PLC 1 (CPU module 10).

As described below, the tool program 441, which is an example of an information processing program executed by the support apparatus 40, is stored in a compact disk read-only memory (CD-ROM) 52 and is distributed. The programs stored in the CD-ROM 52 are read by a CD-ROM drive 48, and are then stored in, for example, the hard disk 44. The programs may also be downloaded from an upper host computer via a network.

E. Input-Output Synchronization Mode in Control System SYS

A method for synchronizing processing performed in the control system SYS according to the present embodiment will now be described. The control system SYS has the time synchronization function with distributed clock (DC), which is a method for synchronizing processing between the PLC 1 (master device) and one or more remote IO terminals 3 (slave devices).

Figure 6A:
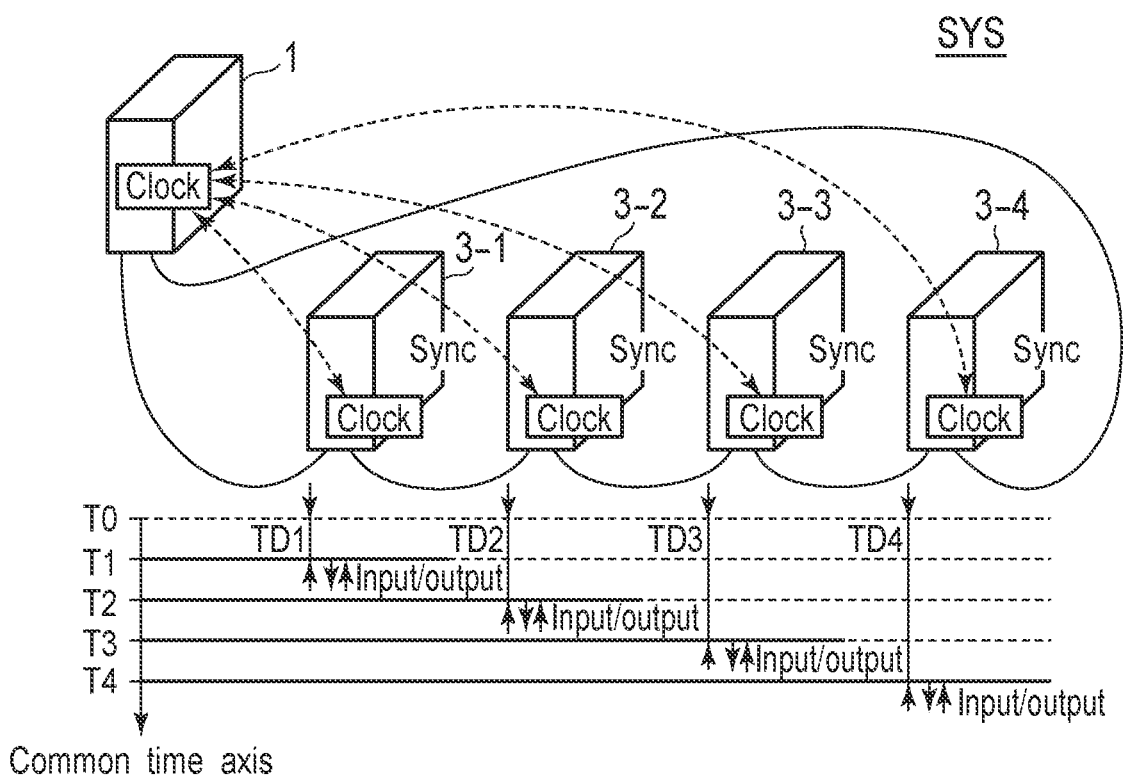
FIGS. 6A and 6B are schematic diagrams describing the time synchronization function of the control system according to the embodiment of the present invention.
Figure 6B:
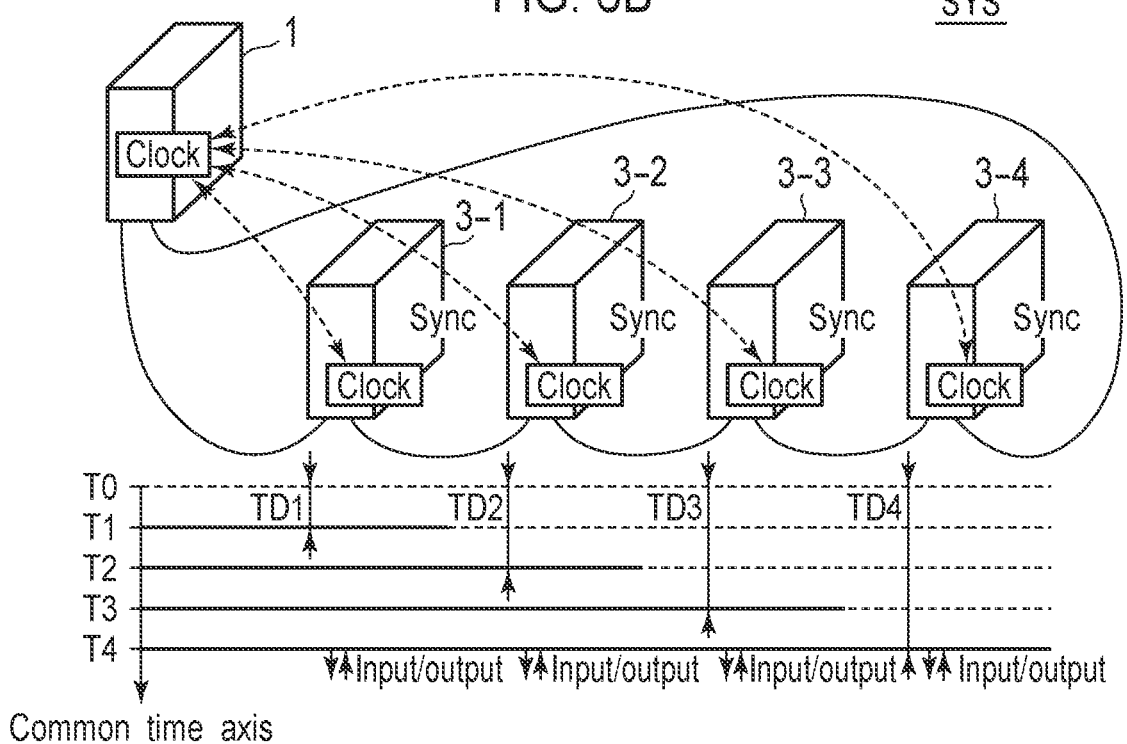

FIGS. 6A and 6B are schematic diagrams describing the time synchronization function of the control system SYS according to the present embodiment. As shown in FIGS. 6A and 6B, the PLC 1 and the remote IO terminals 3-1, 3-2, 3-3, and 3-4 each include a clock, which provides a reference for determining the timing to perform processing in the devices. More specifically, the PLC 1 and the remote IO terminals 3-1 to 3-4 each include a timer serving as a clock, which cyclically generates time information (a reference clock) serving as a reference for the synchronization. The clock of the PLC 1, which is the master device, is used as a reference. Each remote IO terminal 3, which is a slave, synchronizes with the clock of the PLC 1. More specifically, each of the remote IO terminals 3-1 to 3-4 corrects a time difference in its internal timer based on an upper data frame that is transferred cyclically on the field network 2. This allows each of the remote IO terminals 3-1 to 3-4 to generate an internal reference clock at the same timing as a reference clock generated by the clock of the PLC 1.

In this manner, the PLC 1 and the remote IO terminals 3-1 to 3-4 can substantially operate on the common time axis.

FIG. 6A shows the system in which the devices are synchronized using the DC. Referring to FIG. 6A, the remote IO terminals 3-1 to 3-4 each perform predetermined processing at timing specified on the common time axis. However, upper data frames can involve transfer delays. Due to such delays, a time difference TD1 may occur between timing (time T1) at which the processing using data included in an upper data frame in the remote IO terminal 3-1 can be started and timing (time T2) at which the processing using data included in an upper data frame in the remote IO terminal 3-2 can be started. The same applies to the other remote IO terminals 3.

Such transfer delays, or time differences (TD1 to TD4), are small and can cause no problem for common control targets. However, a control target that may operate using a plurality of actuators in synchronization, or specifically a control target involving multi-axis control, may need synchronization (locking) between the timing at which a status value is obtained from the control target (input refresh) and the timing at which an output value to the control target is updated (output refresh) between different remote IO terminals 3 (or between functional units 20 mounted on different remote IO terminals 3).

In response to this, the control system SYS according to the present embodiment is capable of input and output synchronization, which will be described below.

FIG. 6B shows the system in which input-output synchronization is achieved between a plurality of devices. As shown in FIG. 6B, the timing to start the processing is synchronized between the remote IO terminals 3-1 to 3-4. The remote IO terminals 3 thus simultaneously start their processing at time T4. To achieve such input-output synchronization, the timing to start intended processing (phase/starting delay time) is set in the functional units 20 of the remote IO terminals 3-1 to 3-4 using a particular time as a reference. In accordance with the set timing, each functional unit 20 triggers its intended processing. This synchronizes the timing for input refresh as well as the timing for output refresh in real time between the different remote IO terminals 3.

As shown in FIGS. 6A and 6B, the common time can be used by the master device and the slave device(s). This enables the input-output synchronization between all or some of the PLC 1 and the remote IO terminals 3 that are connected to the field network 2. Although a method for setting the input-output synchronization mode for the remote IO terminals 3 will be mainly described for ease of explanation, the same method can be used to set the input-output synchronization mode for the PLC 1 (when serving as a master device and when serving as a slave device). In other words, the CPU module 10 can function as the communication coupler 30, and thus can perform the processing substantially equivalent to the processing that can be performed by the communication coupler 30.

Figure 7:
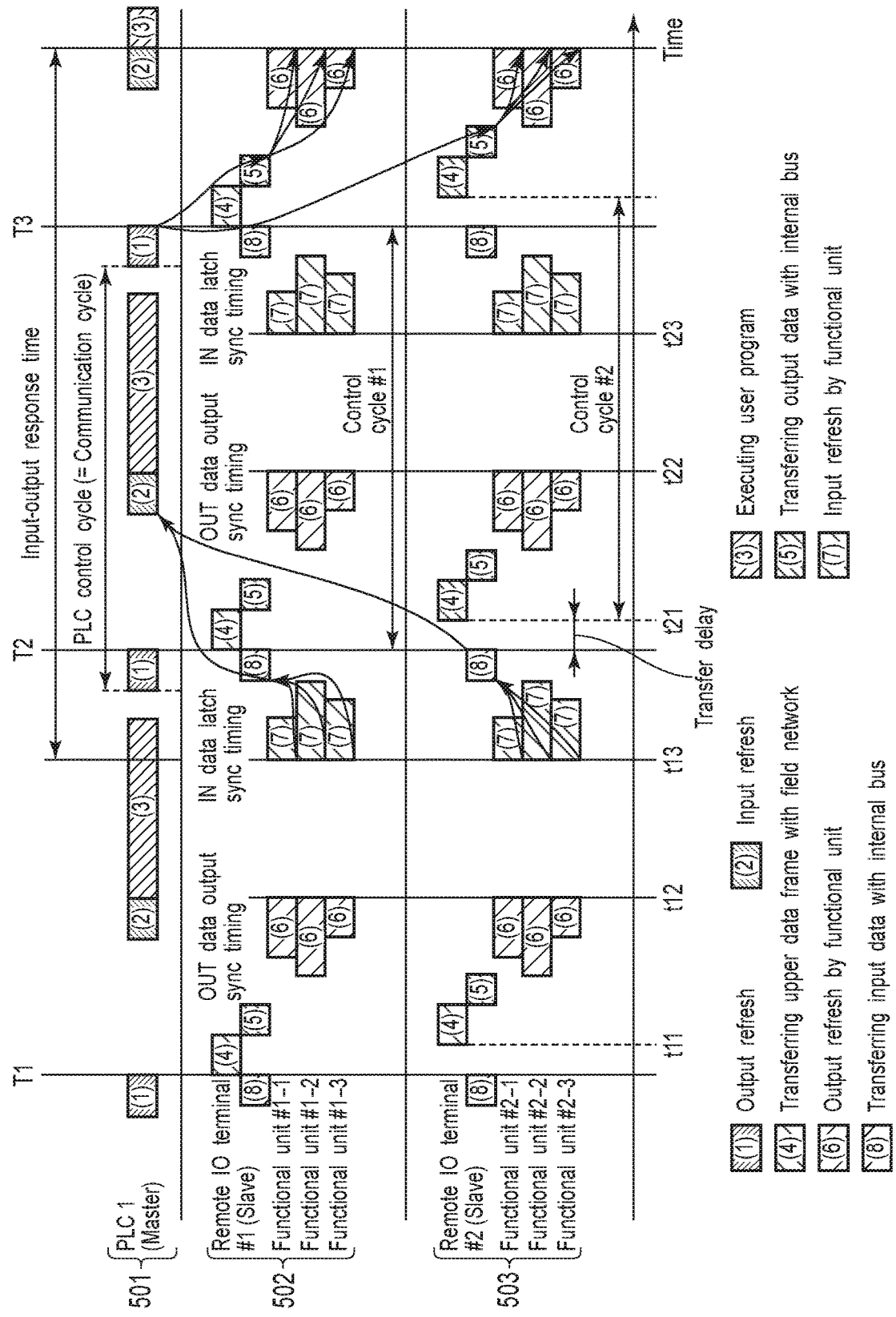
FIG. 7 is a timing chart describing the processing performed by the control system according to the embodiment in which an input-output synchronization mode is set.

The timing settings associated with the input-output synchronization mode will now be described in detail below. FIG. 7 is a timing chart showing the processing performed by the control system SYS according to the present embodiment in which the input-output synchronization mode is set. FIG. 7 shows the control system SYS including the PLC 1, which is the master device, and two remote IO terminals #1 and #2, which are the slave devices.

Referring now to a processing portion 501 in FIG. 7, the PLC 1 repeatedly executes a user program in predetermined PLC control cycles (processing (3) in FIG. 7). The user program typically includes a sequence program and a motion program. When the program executed by the PLC 1 may be incomplete within one PLC control cycle, the program may be executed over multiple PLC control cycles to completely execute the program. Before the user program is executed, the PLC 1 performs the processing for obtaining status values from the control target (input refresh) (processing (2) in FIG. 7). After the user program is executed, the PLC 1 performs the processing for reflecting the result or the output values (output refresh) (processing (1) in FIG. 7). Typically, the period from the start of the preceding output refresh to the start of the next output refresh is calculated as the PLC control cycle.

After the PLC 1 completes the output refresh, the output values of the functional units 20 that are connected to the CPU module 10 via the internal bus 11 are updated. At the same time, the PLC 1 starts transmitting upper data frames including the results (output values) calculated through the output refresh.

Referring now to processing portions 502 and 503 in FIG. 7, the upper data frame transmitted from the PLC 1 is sequentially transferred to the communication coupler 30 via the field network 2 (processing (4) in FIG. 7). The period from when the head of the upper data frame reaches the communication coupler 30 included in the remote IO terminal #1 to when the head of the same upper data frame reaches the communication coupler 30 included in the remote IO terminal #2 corresponds to a transfer delay. In other words, a difference on the time axis between the upper data frame of the remote IO terminal #1 (processing (4) in FIG. 7) and the upper data frame of the remote IO terminal #2 (processing (4) in FIG. 7) corresponds to a transfer delay.

The control cycle (PLC control cycle) in the PLC 1 matches the transmission cycle (communication cycle) in which an upper data frame is transmitted.

When the communication coupler 30 in each of the remote IO terminals #1 and #2 completely receives the upper data frame, data (internal bus OUT frame) to be transmitted to the functional units 20 mounted on the remote IO terminals #1 and #2 is transferred to the functional units 20 via the internal bus 31 (processing (5) in FIG. 7).

Each functional unit 20 updates the output value for the control target (output refresh) in accordance with the internal bus OUT frame transferred via the internal bus 31 (processing (6) in FIG. 7). Each functional unit 20 then obtains the status value from the control target (input refresh) (processing (7) in FIG. 7). Subsequently, the data (internal bus IN frame) including the status value obtained by each functional unit 20 is transferred to the communication coupler 30 via the internal bus 31 (processing (8) in FIG. 7). The communication coupler 30 then reflects the received internal bus IN frame in the upper data frame, and transfers the upper data frame to the subsequent communication coupler 30 (processing (4) in FIG. 7).

Each remote IO terminal 3 (communication coupler 30) receives an upper data frame and obtains data indicating the output value from the received upper data frame, and then provides the obtained output value to the corresponding functional unit 20. Each remote IO terminal 3 (communication coupler 30) also obtains the status value from the corresponding functional unit 20, and adds data indicating the obtained status value to the upper data frame, which is sequentially transmitted on the field network 2. In other words, the data updating process performed between the PLC 1 (CPU module 10) and each remote IO terminal 3 (each communication coupler 30) via the field network 2 is performed in parallel with the data updating process between each communication coupler 30 and the corresponding functional unit 20 via the internal bus 31.

The control system SYS according to the present embodiment synchronizes the timing at which each functional unit 20 updates the output value (precisely the time at which the update of the output value is complete) between the functional units 20. The timing to update the output value is also referred to the OUT data output sync timing. All the functional units may have the output data (OUT data) at this OUT data output sync timing. To achieve this, the timing to start the output refresh is determined based on the time taken by each functional unit 20 to perform the output processing.

The control system SYS according to the present embodiment also synchronizes the timing at which the status value is obtained from the control target (input refresh) between the functional units 20. The timing to obtain the status value is also referred to as IN data latch sync timing. The IN data latch refers to obtaining the signal value input into each functional unit 20 at predetermined timing. Each remote IO terminal 3 may obtain the status value from the control target (input refresh) before receiving an upper data frame transferred in the next transfer cycle. Upper data frames are transferred sequentially. The upper data frames reach each remote IO terminal 3 at different timing depending on the location at which each remoter IO terminal is connected to the field network 2. In this case, the IN data latch sync timing is to be determined based on the time taken by each functional unit 20 to perform the input processing, and the transfer delay involved in the upper data frame.

Setting the input-output synchronization mode as described above enables synchronization of the timing for input refresh as well as the timing for output refresh between the functional units 20 of the different remote IO terminals 3, and thus enables, for example, multi-axis control to be performed with higher accuracy.

The cycle in which output refresh is repeated and the cycle in which input refresh is repeated (control cycle #1 and control cycle #2) in the remote IO terminals #1 and #2 match the cycle of the PLC control. However, when the input-output synchronization mode is set, the time taken before each functional unit 20 reflects the output value determined based on the status value (input value) obtained from the control target (input-output response time) would be longer than the PLC control cycle.

F. Issue in Input-Output Synchronization Mode of Control System SYS

Figure 8:
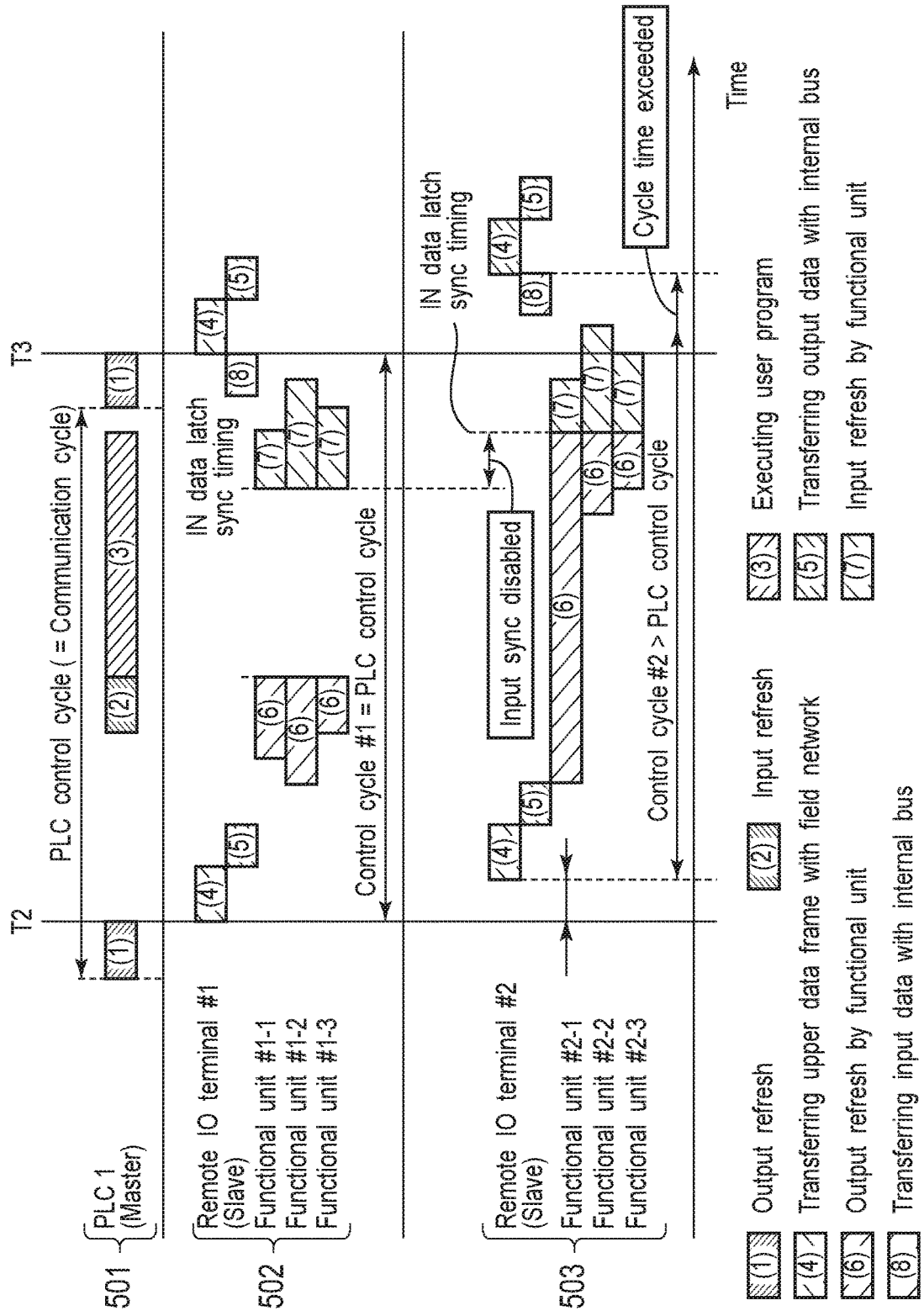
FIG. 8 is a timing chart describing the processing performed by the control system according to the embodiment in which the input-output synchronization mode is set.

One issue in the input-output synchronization mode described above will now be described. FIG. 8 is a timing chart describing the issue in the input-output synchronization mode of the control system SYS according to the present embodiment.

In the timing chart shown in FIG. 8, the time taken for output refresh of the functional unit #2-1 included in the remote IO terminal #2 is longer than the time taken for output refresh of other functional units. In this case, the timing at which all the functional units included in the remote IO terminal #2 complete output refresh (processing (6) in FIG. 8) comes after the timing at which each functional unit included in the remote IO terminal #1 starts input refresh (processing (7) in FIG. 8). In this case, the IN data latch sync timing of the remote IO terminal #1 does not match the IN data latch sync timing of the remote IO terminal #2. This disables the input synchronization. The time taken for the entire processing performed by each functional unit included in the remote IO terminal #2 to first perform input refresh and then perform output refresh (control cycle #2) becomes longer than the PLC control cycle. In other words, the processing exceeds the cycle time. Such parameter settings are inappropriate.

In this case, the PLC control cycle (or the communication cycle of an upper data frame) may be lengthened to accommodate the output refresh of the functional unit #2-1 included in the remote IO terminal #2. More specifically, when the input-output synchronization mode is set in the present embodiment, the PLC control cycle is adjusted to accommodate the longest time taken for the input refresh and the longest time taken for the output refresh for the functional units 20 included in the target remote IO terminal 3. The IN data latch sync timing and the OUT data output sync timing are then set accordingly.

However, the longer PLC control cycle causes longer response time for input and output, and consequently lowers the responsiveness of the entire control system. To respond to this issue, the input-output synchronization mode (synchronize the timing for input refresh and the timing for output refresh) is to be set between the functional units 20, while the communication cycle of upper data frames transferred on the field network 2 is also to be shortened.

G. Selective Mode in Control System SYS

In response to the above issue, the control system SYS according to the present embodiment is capable of setting the input-output synchronization mode between selected ones of the functional units 20, in addition to setting the input-output synchronization mode between all the functional units 20. More specifically, the input-output synchronization mode is set between selected ones of the functional units 20 included in the control system SYS, whereas the other functional units 20 may perform output refresh and input refresh at timing different from the timing used in the input-output synchronization mode.

g1: Input Priority Mode

Figure 9:
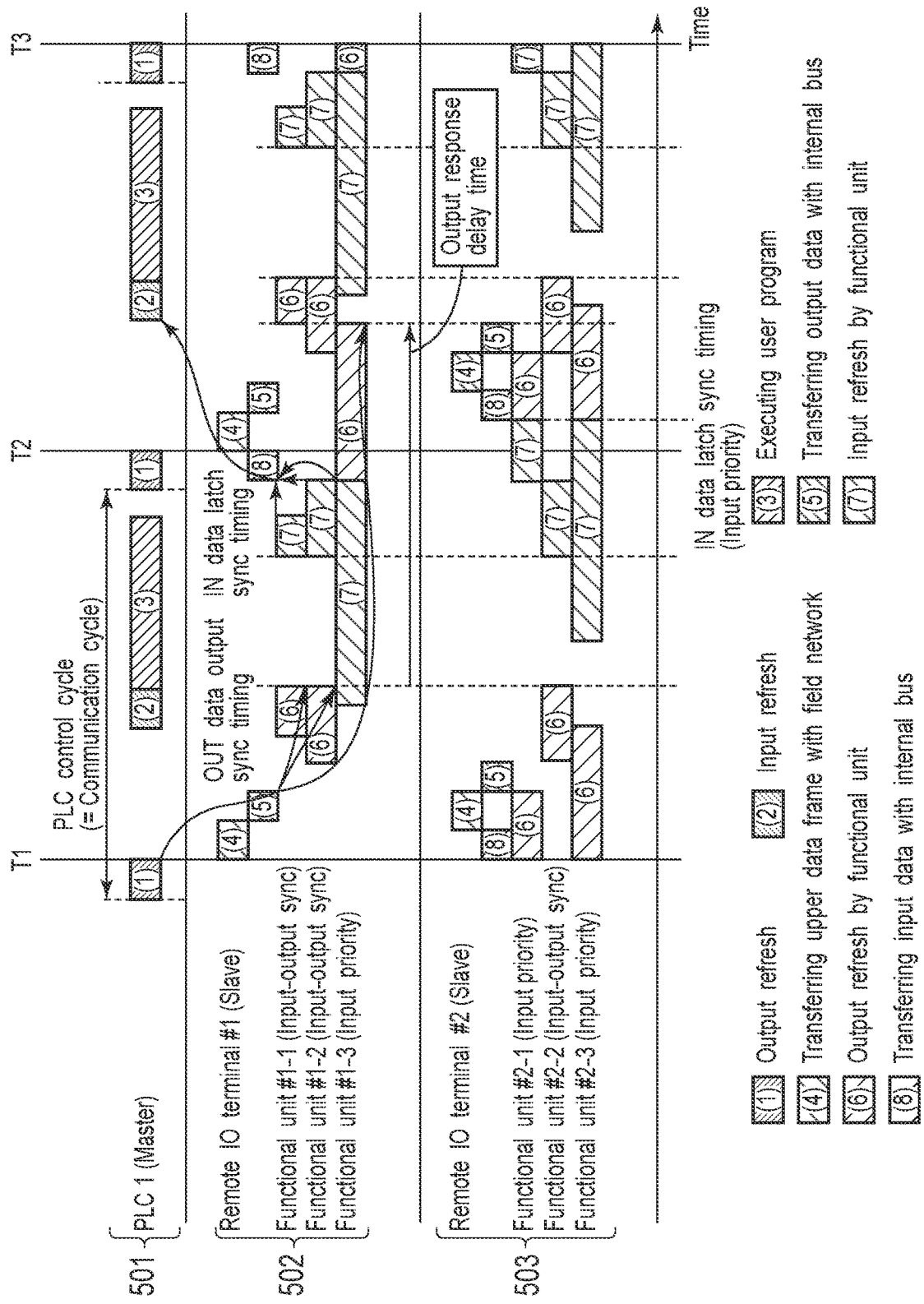
FIG. 9 is a timing chart describing the processing performed by the control system according to the embodiment in which the input-output synchronization mode is partially set.

FIG. 9 is a timing chart showing the processing performed by the control system SYS according to the present embodiment in which the input-output synchronization mode is partially set. In the example shown in FIG. 9, the time taken for input refresh by the functional unit #1-3 included in the remote IO terminal #1 and by the functional unit #2-3 included in the remote IO terminal #2 is longer than the time taken for input refresh by the other functional units.

In the example shown in FIG. 9, the input-output synchronization mode is set between the functional units #1-1,

1-2, and #2-2. The functional units #1-1, #1-2, and #2-2 simultaneously start the input refresh at the IN data latch sync timing, and simultaneously complete the output refresh at the OUT data output sync timing.

For the other functional units #1-3, #2-1, and #2-3, the timing for output refresh and the timing for input refresh are set in an input priority mode. In the input priority mode, input refresh is performed with higher priority, and the control cycle of the remote IO terminal is shortened. The input priority mode is set based on the assumption that the status value is to be obtained from the control target at timing as closest as possible to the timing at which the value is used in the user program. As shown in FIG. 9, the functional units #1-3, #2-1, and #2-3 with the input priority mode complete their input refresh immediately before the next upper data frame reaches these functional units. Upon completing the input refresh, these functional units immediately start output refresh.

The timing at which the next upper data frame reaches the functional units differs among different remote IO terminals 3. In other words, the functional units 20 included in the same remote IO terminal 3 obtain the status value from the control target (input refresh) at the same timing. This timing is referred to as IN data latch sync timing (input priority). More specifically, the timing for output refresh and the timing for input refresh are set for each functional unit 20 with the input property mode mainly based on the communication cycle of an upper data frame.

However, when the time taken for input refresh is longer than the PLC control cycle, the output value calculated based on the status value collected in one PLC control cycle is reflected by each functional unit 20 in the next PLC control cycle (refer to the functional unit #1-3).

g2: Output Priority Mode

Figure 10:
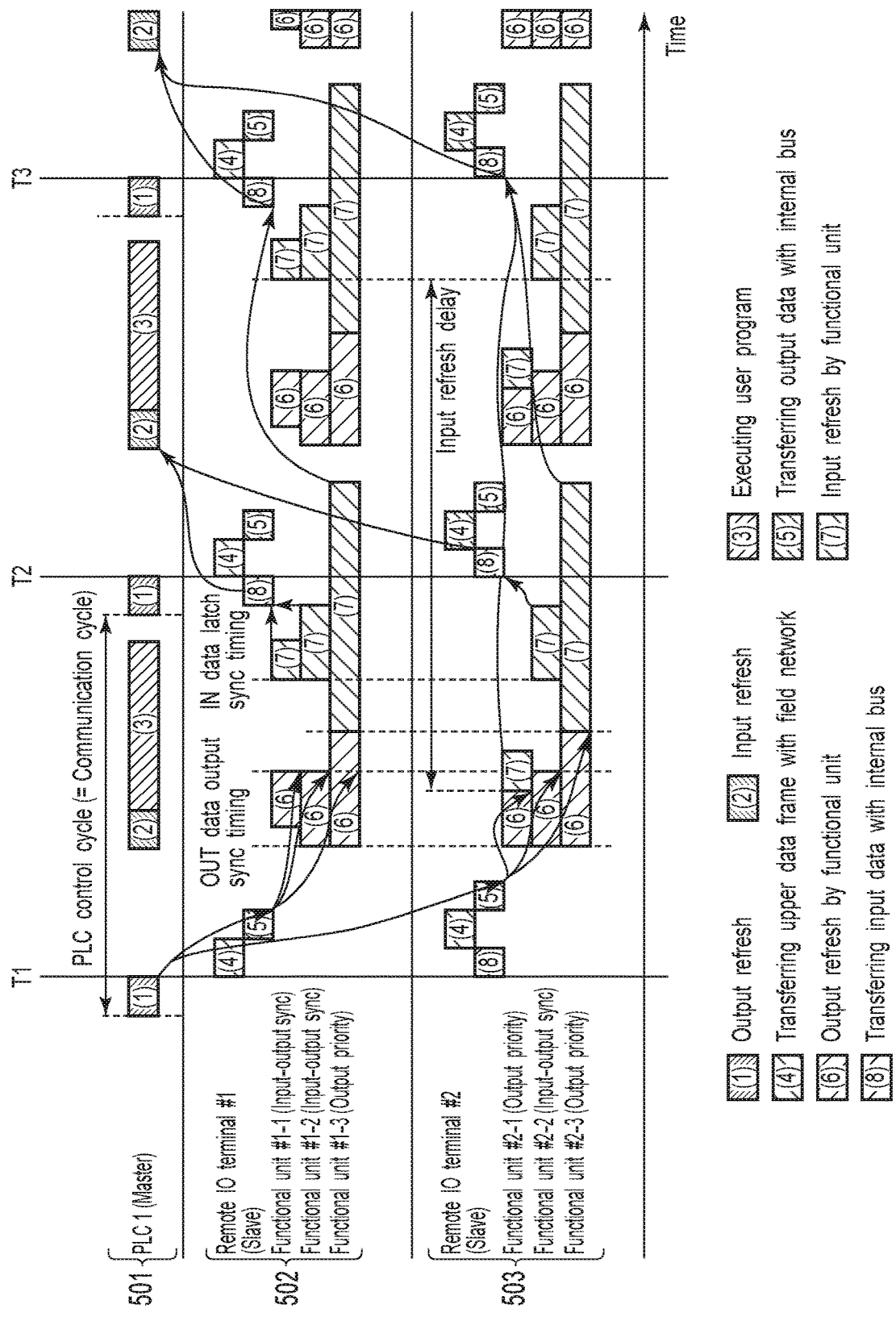
FIG. 10 is another timing chart describing the processing performed by the control system according to the embodiment in which the input-output synchronization mode is partially set.

FIG. 10 is another timing chart showing the processing performed by the control system SYS according to the present embodiment in which the input-output synchronization mode is partially set. In the example shown in FIG. 10, the time taken for input refresh by the functional unit #1-3 included in the remote IO terminal #1 and by the functional unit #2-3 included in the remote IO terminal #2 is longer than the time taken for input refresh by the other functional units.

In the example shown in FIG. 10, the input-output synchronization mode is set between the functional units #1-1, #1-2, and #2-2. The functional units #1-1, #1-2, and #2-2 simultaneously start the input refresh at the IN data latch sync timing, and simultaneously complete the output refresh at the OUT data output sync timing.

For the other functional units #1-3, #2-1, and #2-3, the timing for output refresh and the timing for input refresh are set in an output priority mode. In the output priority mode, output refresh is started based on reference time information (hereafter referred to system time sync timing or Sync0). As shown in FIG. 10, the functional units #1-3, #2-1, and #2-3 with the output priority mode start their output refresh at the system time sync timing (Sync0). Upon completing the output refresh, these functional units immediately start input refresh.

The system time sync timing (Sync0) is commonly used by the PLC 1 and the remote IO terminals 3. Thus, the functional units 20 with the output priority mode start their output refresh at the same timing. In other word, the timing for output refresh and the timing for input refresh are mainly set for each functional unit 20 with the output priority mode mainly based on the communication cycle of a data frame using the system time sync timing (Sync0).

However, when the time taken for input refresh greatly differs from the PLC control cycle, the functional units 20 may have state values (input values) for the same upper data frame differing from each other by a value corresponding to the control cycle (refer to the functional units #2-1 and #2-3).

g3: Multiple Input-Output Priority Modes

Figure 11:
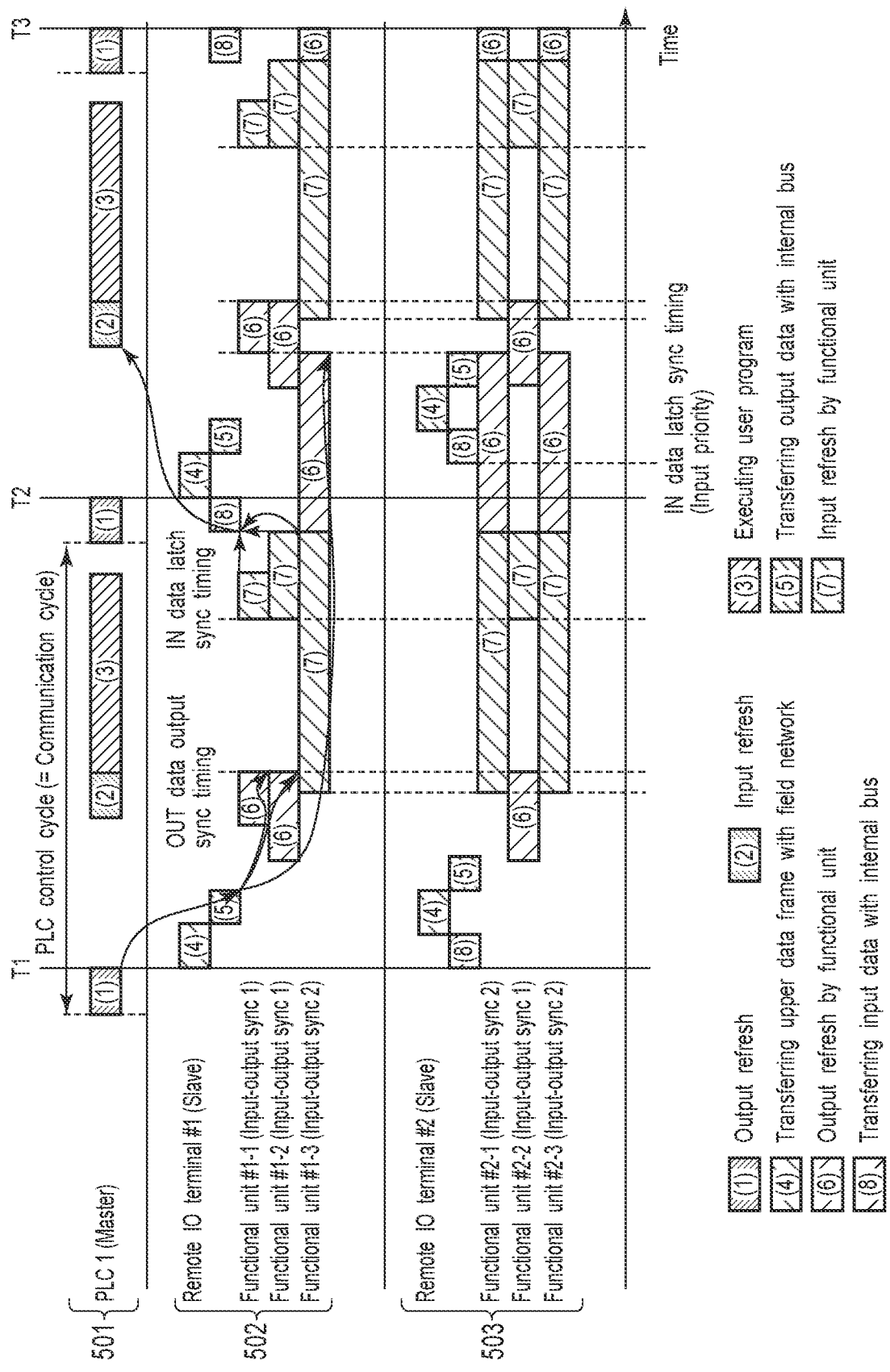
FIG. 11 is a timing chart describing the processing performed by the control system according to the embodiment in which different input-output synchronization modes are set.

FIG. 11 is a timing chart showing the processing performed by the control system SYS according to the present embodiment in which different input-output synchronization modes are set. In the example shown in FIG. 11, a first input-output synchronization mode is set for the functional units #1-1, #1-2, and #2-2, whereas a second input-output synchronization mode is set for the functional units #1-3, #2-1, and #2-3. The functional units #1-1, #1-2, and #2-2 simultaneously start input refresh at IN data latch sync timing 1, and simultaneously complete output refresh at OUT data output sync timing 1. In the same manner, the functional units #1-3, #2-1, and #2-3 simultaneously start input refresh at IN data latch sync timing 2, and simultaneously complete output refresh at OUT data output sync timing 2.

In the first input-output synchronization mode, the IN data latch sync timing 1 and the OUT data output sync timing 1 occur in every PLC control cycle (more specifically, the communication cycle of an upper data frame). In the second input-output synchronization mode, the IN data latch sync timing 1 and the OUT data output sync timing 1 may not occur within one PLC control cycle. However, the input refresh and the output refresh are both synchronized between the functional units 20 for which the second input-output synchronization mode is set.

g4: Summary

As describes above, the control system SYS according to the present embodiment can set the mode for synchronizing the timing to obtain a status value from the control target (IN data latch sync timing) as well as the timing to update an output value for the control target (OUT data output sync timing) between all the functional units 20 included in each remote IO terminal 3 (slave device) (specifically when the input-output synchronization mode is set for all the functional units 20).

Additionally, the control system SYS can set the mode for synchronizing the timing to obtain a status value from the control target (IN data latch sync timing) as well as the timing to update an output value for the control target (OUT data output sync timing) between specific functional units 20 included in each remote IO terminal 3 (slave device) (specifically when the input-output synchronization mode is set for selected ones of the functional units 20). In this case, the control system SYS can set the mode for synchronizing either the timing to obtain a status value from the control target or the timing to update an output value for the control target (the input priority mode or the output priority mode) between functional units 20 excluding the specific functional units (more specifically, functional units 20 for which the input-output synchronization mode is not set) in the remote IO terminal 3 (slave device).

Further, the control system SYS according to the present embodiment may set the mode for synchronizing the timing to obtain a status value from the control target (IN data latch sync timing) as well as the timing to update an output value for the control target (OUT data output sync timing) (specifically when the input-output synchronization mode is set for all the functional unit 20) between all the functional units 20 included in the PLC 1 (master device or slave device).

Additionally, the control system SYS may set the mode for synchronizing the timing to obtain a status value from the control target (IN data latch sync timing) as well as the timing to update an output value for the control target (OUT data output sync timing) (specifically when the input-output synchronization mode is set for selected ones of the functional units 20) between the specific functional units 20 included in the PLC 1 (master device or slave device). In this case, the control system SYS can set the mode for synchronizing either the timing to obtain a status value from the control target or the timing to update an output value for the control target (the input priority mode or the output priority mode) between functional units 20 excluding the specific functional units (more specifically, functional units 20 for which the input-output synchronization mode is not set) in the PLC 1 (master device or slave device).

As shown in FIG. 11, the control system SYS may set two different input-output synchronization modes. More specifically, the control system SYS synchronizes the timing to obtain a status value from the control target (IN data latch sync timing 1) as well as the timing to update an output value for the control target (OUT data output sync timing 1) between specific functional units 20 included in the PLC 1 (master device or slave device) or in each remote IO terminal 3 (slave device). The control system SYS also synchronizes the timing to obtain a status value from the control target (IN data latch sync timing 2) as well as the timing to update an output value from the control target (OUT data output sync timing 2) between functional units 20 excluding the specific functional units 20 in each remote IO terminal 3 (slave device), independently of the specific functional units.

H. Timing Settings by Support Apparatus

The timing to obtain a status value (input refresh) and the timing to update an output value (output refresh) in the functional units 20 shown in the timing charts of FIGS. 7 to 11 are calculated and set by the support apparatus 40 according to the present embodiment. The parameters used by the support apparatus 40 are calculated and set with the procedure described below.

For functional units 20 with the input-output synchronization mode in the control system SYS of the present embodiment, the OUT data output sync timing and the IN data latch sync timing are determined. With one typical design method, the PLC control cycle is designed in advance in accordance with a control target, the processing to be performed, and an upper data frame. More specifically, the timing is determined under predetermined conditions including the PLC control cycle and the communication cycle of an upper data frame.

For functional units 20 with the input priority mode or with the output priority mode, either the OUT data output sync timing or the IN data latch sync timing is set.

As described above, the support apparatus 40 calculates parameters for each functional unit 20 included in the PLC 1 (master device or slave device) or in the remote IO terminals 3 (slave devices) in a selected one of a plurality of available modes, and sets the calculated parameters used in the control system SYS.

The time taken for input refresh and the time taken for output refresh will now be described. The operations associated with settings performed in the support apparatus 40 will also be described.

h1. Input Refresh

Figure 12A:
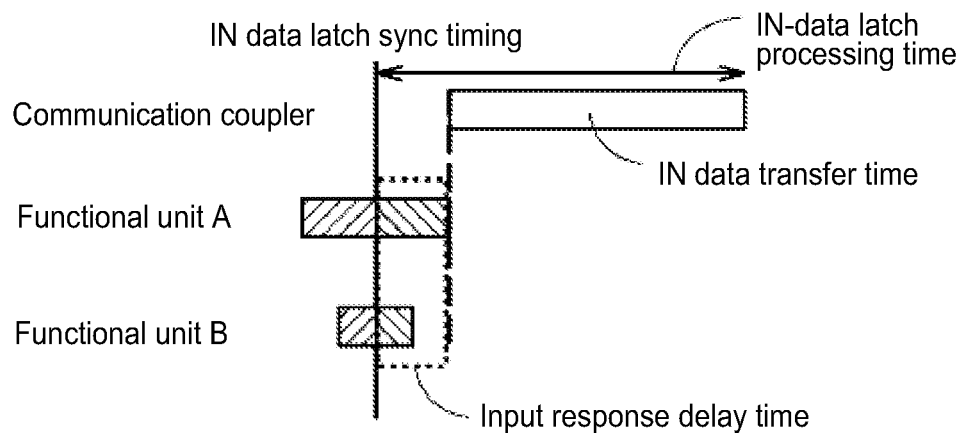
FIGS. 12A and 12B are diagrams describing the time taken for input refresh in the control system according to the embodiment of the present invention.
Figure 12B:
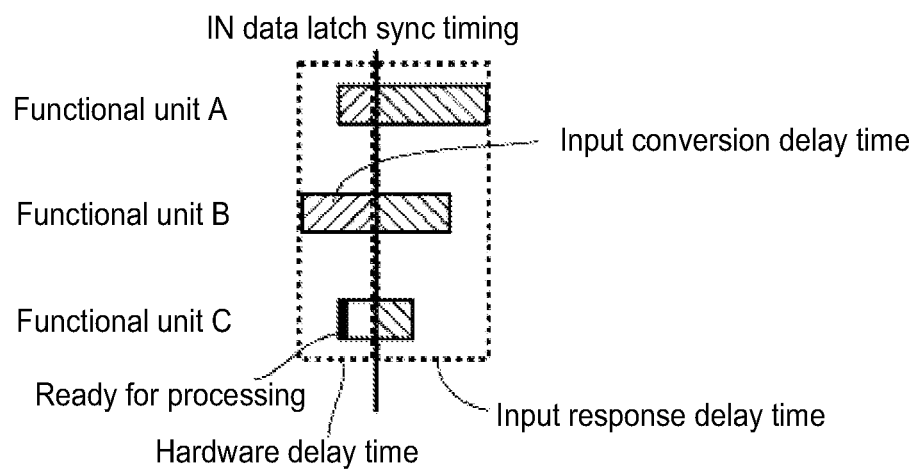

FIGS. 12A and 12B are diagrams describing the time taken for input refresh in the control system SYS according to the present embodiment. FIG. 12A schematically shows the time taken for input refresh in each communication coupler 30 included in the remote IO terminal 3. FIG. 12B schematically shows the time taken for input refresh in each functional unit 20 included in the communication coupler 30.

As shown in FIG. 12A, the time taken for input refresh in each communication coupler 30 is referred to as an IN-data latch processing time, which starts from the IN data latch sync timing. The IN-data latch processing time corresponds to the total of the maximum input response delay time for each functional unit 20 connected to the internal bus 31 and the IN data transfer time.

The input response delay time for each functional unit 20 includes the time taken for signal conversion or value conversion in the IO module 206 (refer to FIG. 4) and the time taken to copy data from the IO module 206 into the transmission processing unit 240 (refer to FIG. 4). The PLC 1 or each remote IO terminal 3 may include a plurality of functional units 20. In this case, the maximum value of their input response delay times is used because the longest input response delay time can be a limiting factor.

The IN data transfer time includes the time taken to receive an internal bus frame via the internal bus 31 included in the internal bus controller 130 (FIG. 3) in the communication coupler 30, and the time taken to copy IN data included in the received internal bus frame to the field network controller 110 (FIG. 3).

As shown in FIG. 12B, the time taken for the input processing in each functional unit 20 is referred to as an input response delay time, which starts from the IN data latch sync timing. In this case, the input response delay time is the same as described with reference to FIG. 12A.

However, each functional unit 20 may involve a hardware delay time occurring before it is ready for input processing. The hardware delay time may include a delay time corresponding to a deviation in the computation cycle of the processor included in each functional unit 20. The hardware delay time may further include an input conversion delay generated during conversion of an input signal to a digital signal. These parameters are basically unique to each functional unit 20, and are set to the values prestored in, for example, a device profile 443 as described later.

h2. Output Refresh

Figure 13A:
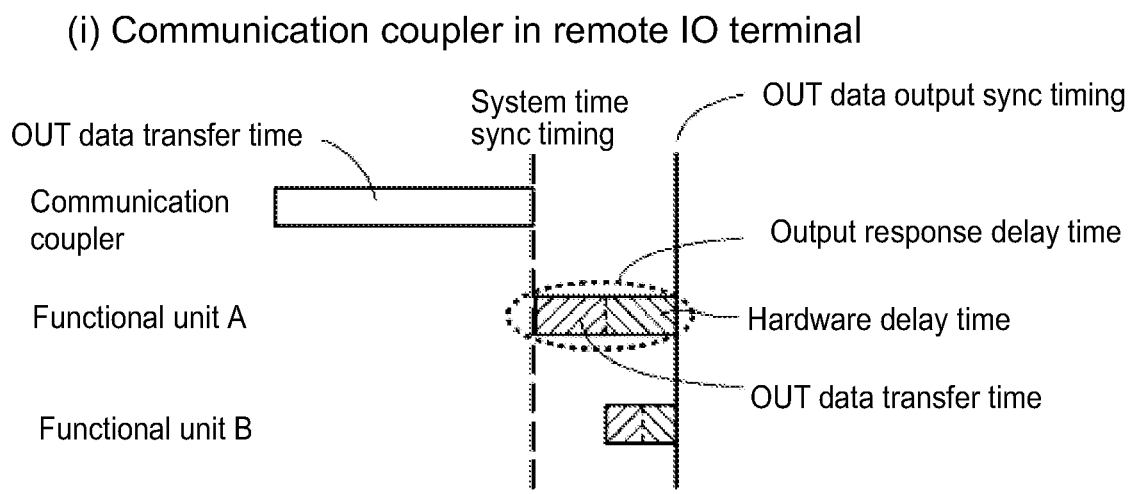
FIGS. 13A and 13B are diagrams describing the time taken for output refresh in the control system according to the embodiment of the present invention.
Figure 13B:
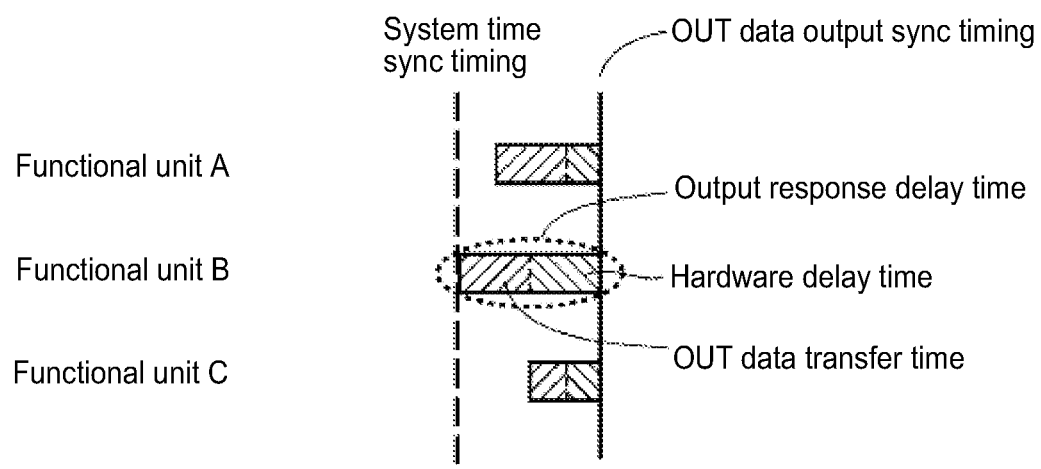

FIGS. 13A and 13B are diagrams describing the time taken for output refresh in the control system SYS according to the present embodiment. FIG. 13A schematically shows the time taken for output refresh in each communication coupler 30 included in the remote IO terminal 3. FIG. 13B schematically shows the time taken for output refresh in each functional unit 20 included in the communication coupler 30.

As shown in FIG. 13A, the time taken for output refresh in each communication coupler 30 is referred to as an OUT data transfer time. The OUT data transfer time includes the time taken by each field network controller 110 (FIG. 3) included in the communication coupler 30 to receive an upper data frame via the field network 2, and the time taken to copy OUT data included in the received upper data frame into its internal bus controller 130 (FIG. 3).

The output response delay time for each functional unit 20 includes an OUT data transfer time and a hardware delay time. The OUT data transfer time includes the time taken to copy data from each reception processing unit 230 (FIG. 4) into the IO module 206, and the time taken for signal conversion or value conversion in the IO module 206 (FIG. 4). The hardware delay time may include a delay time corresponding to a deviation in the computation cycle in the processor included in each functional unit 20, or an input conversion delay time generated during conversion of an input signal to a digital signal. These parameters are basically unique to each functional unit 20, and are set to the values prestored in, for example, the device profile 443 as described later.

The PLC 1 or each remote IO terminal 3 may include a plurality of functional units 20. In this case, the maximum value of their input response delay times is used because the longest input response delay time can be a limiting factor.

As shown in FIG. 13B, the time taken for output refresh in each functional unit 20 is referred to as an output response delay, which is before the OUT data latch synchronization timing. The output response delay time is the same as described with reference to FIG. 13A.

h3. Data Structure

The parameters shown in FIGS. 12A to 13B described above include parameters unique to each functional unit 20. The values of such unique parameters are read from the corresponding device profile 443. The structure of data stored in each device profile 443 included in the support apparatus 40 will now be described.

Figure 14:
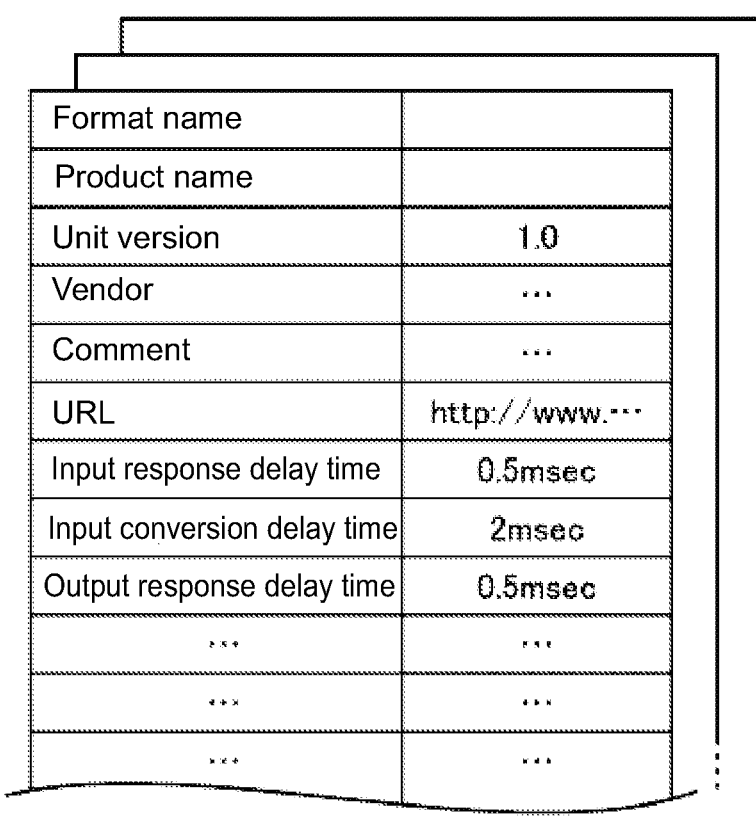
FIG. 14 is a diagram showing the data structure of a device profile stored in a support apparatus included in the control system according to the embodiment of the present invention.

FIG. 14 is a diagram showing the data structure of each device profile 443 stored in the support apparatus 40 included in the control system SYS of the present embodiment. Referring to FIG. 14, the device profile 443 is prepared for each functional unit, and includes information for identifying the corresponding functional unit (e.g., a format name, a product name, a unit version, a vendor, comments, and a URL). Each device profile 443 includes parameters unique to the corresponding functional unit (e.g., an input response delay time, an input conversion delay time, and an output response delay time). More specifically, information about the time taken to automatically calculate a parameter associated with, for example, the input-output synchronization mode is obtained by referring to the device profile 443.

When designing the control system SYS, the user sets information about the components of the PLC 1, such as the type, the number, and the locations of the CPU module 10, the functional units 20, and the power supply unit 12 by operating the support apparatus 40. In the same manner, the user sets the slave devices to be connected to the field network 2, and the configuration of each slave device by operating the support apparatus 40. For each remote IO terminal 3, for example, the user sets the type, the number, and the locations of the communication coupler 30, the functional units 20, and other units.

The information about the design of the control system SYS is stored into the support apparatus 40 as configuration information 442. The configuration information 442 is transferred from the support apparatus 40 to the CPU module 10 or to the communication coupler 30 when needed. The configuration information 442 is used to generate configuration information 104 (FIG. 3), which is stored into the communication coupler 30 or the nonvolatile memory 101 included in the CPU module 10.

The parameters shown in FIGS. 12A to 13B described above include parameters dependent on the number and the locations of the functional units 20 included in the PLC 1 and the communication coupler 30. To automatically calculate such parameters, the configuration information 442 is referred to in addition to the parameters stored in the device profile 443. In other words, the estimated time taken to automatically calculate the parameters is determined based on the corresponding design values of the control system SYS defined by the configuration information 104. In this case, the maximum value of the estimated times defined by the configuration information 442 in the control system SYS is used.

h4. User Interface 1

Each functional unit 20 for which the input-output synchronization mode described above is to be set can be selected by using a user interface described below. The support apparatus 40 is capable of accepting a selection of specific functional units 20 from the functional units 20 included in the PLC 1 (master device or slave device) or in the remote IO terminal 3 (slave device).

The user interface used to set the input-output synchronization mode selectively for multiple functional units 20 using the support apparatus 40 will now be described. The support apparatus 40 provides the user interface for designing the PLC 1 (master device or slave device) and each remote IO terminal 3 (slave device) included in the control system SYS.

Figure 16:
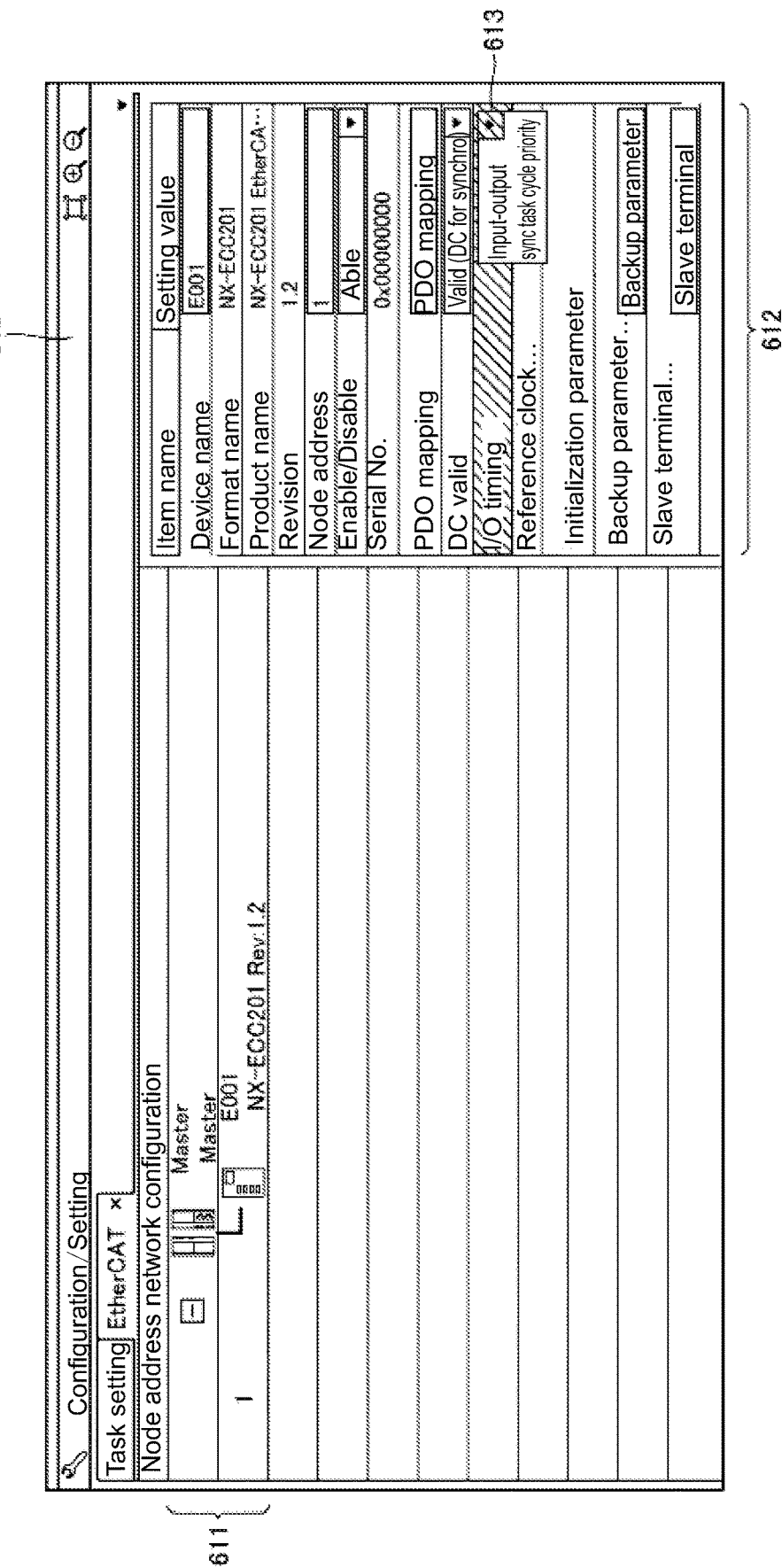
FIG. 16 is a diagram showing a user interface screen corresponding to the method shown in FIGS. 15A to 15C.

FIGS. 15A to 15C are schematic diagrams showing a method for selectively setting the input-output synchronization mode in the control system SYS according to the present embodiment. FIG. 16 is a diagram showing a user interface screen in correspondence with the setting method shown in FIGS. 15A to 15C.

As shown in FIG. 15A, each functional unit 20 included in the control system SYS is given information indicating whether the input-output synchronization mode can be set, and whether the input priority mode or the output priority mode can be set. The information indicating whether these modes can be set is determined based on the characteristics of each functional unit 20. For example, functional units that take a relatively long time for input processing (e.g., an encoder input unit or an analog input unit), and functional units that take a relatively long time for output processing (e.g., a pulse output unit and a servo control unit) can be designed to have the input priority mode or the output priority mode in addition to the input-output synchronization mode. In contrast, functional units that can perform the input and output processing at relatively high speed, such as a digital input unit and a digital output unit, can be designed to have the input-output synchronization mode.

The support apparatus 40 provides a user interface screen 610 shown in FIG. 16. The user selects a target device from a list of a master device and slave devices included in the control system SYS (area 611). Attribute information for the selected device is displayed in a list (area 612). When the I/O timing is selected from the list of attribute information, either the input-output synchronization or the task cycle priority can be selected.

When the input-output synchronization is selected instead, the input-output synchronization mode is set for all the functional units 20 included in the target device (either the master device or one of the slave devices) (refer to FIG. 15B).

When the task cycle priority is selected, either the input priority mode or the output priority mode is set for the functional units 20 for which the input priority mode/the output priority mode can be set, selectively from the functional units 20 included in the target device (either the master device or one of the slave devices). The input-output synchronization mode is then set for the other functional units 20 (refer to FIG. 15C).

With the setting mode shown in FIG. 15B or 15C, the support apparatus 40 calculates the system time sync timing, the OUT data output sync timing (or the timing for output refresh), and the IN data latch sync timing (or the timing for input refresh) for each target functional unit 20.

h5. User Interface 2

Figure 17:
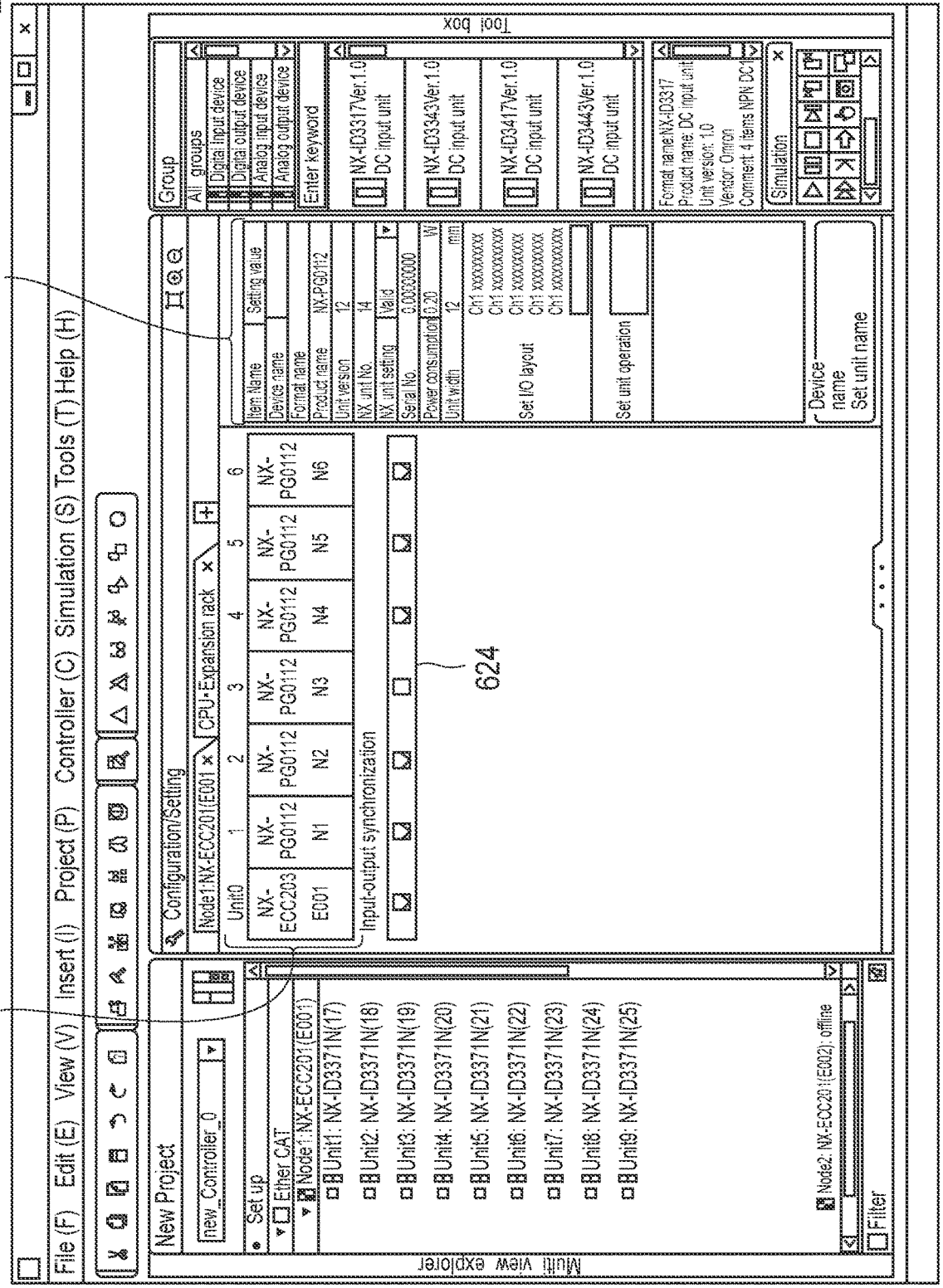
FIG. 17 is a diagram showing a user interface screen provided by the support apparatus according to the embodiment of the present invention.

FIG. 17 is a diagram showing a user interface screen provided by the support apparatus 40 according to the present embodiment. A user interface screen 620 shown in FIG. 17 is used to design the unit configuration of the PLC 1 and each remote IO terminal 3. The user operates a mouse or a keyboard on the user interface screen 620 shown in FIG. 17 to select functional units 20 to be mounted on the PLC 1 or to be mounted on the remote IO terminal 3 and to arrange them in an intended layout (area 622). On the user interface screen 620 shown in FIG. 17, the user can also set parameters for each functional unit 20 (area 626). The user sets configuration information (configuration) on the user interface screen 620 shown in FIG. 17, which is then stored into the hard disk 44 as the configuration information 442.

The user interface screen 620 shown in FIG. 17 allows the user to freely select functional units 20 for which the input-output synchronization mode is to be set, from the functional units 20 mounted on (or to be mounted on) the PLC 1 or the remote IO terminal 3. In one example, the user interface screen 620 displays checkboxes corresponding to the layout of one or more functional units 20 to be mounted (area 624). The user checks a checkbox to set the input-output synchronization mode for the corresponding target functional unit 20. A mode other than the input-output synchronization mode is set for each functional unit 20 with an unchecked checkbox.

The functional unit 20 for which any mode has been set may appear in a different color indicating the selected mode in the layout. This color display allows the user to identify the mode set for each functional unit 20 by quickly viewing the screen.

h6. User Interface 3

Figure 18:
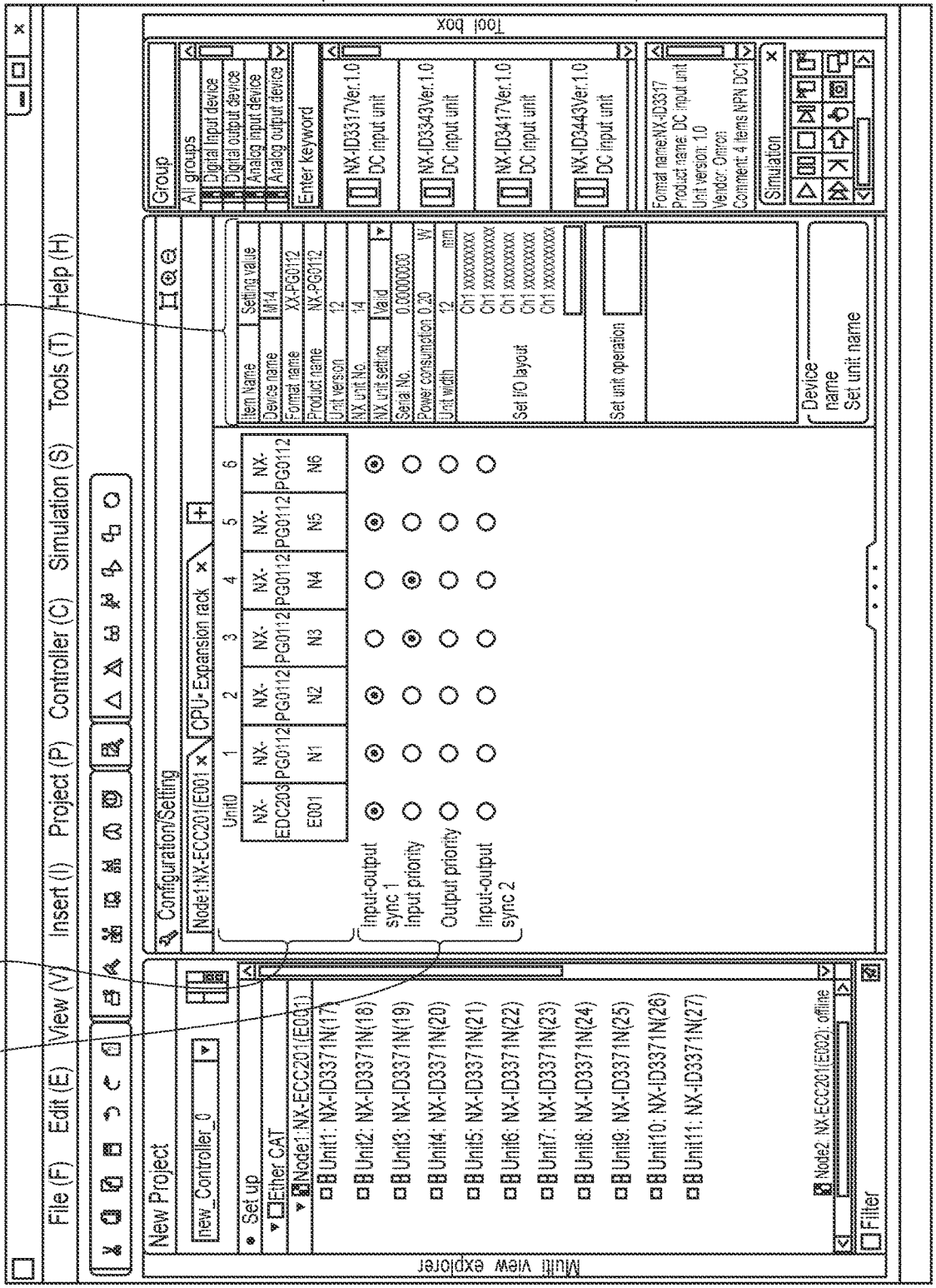
FIG. 18 is a diagram showing another user interface screen provided by the support apparatus according to the embodiment of the present invention.

FIG. 18 is a diagram describing another user interface screen provided by the support apparatus 40 according to the present embodiment. On a user interface screen 630 shown in FIG. 18, the user can freely select the mode to be set for each functional unit 20 mounted on (or to be mounted on) the PLC 1 or the remote IO terminal 3. In one example, the user interface screen 630 displays sets of radio buttons corresponding to the layout of one or more functional units 20 to be mounted (are 632). The sets of radio buttons include four modes, namely, an input-output synchronization mode 1, an input-output synchronization mode 2, an Input priority mode, and an output priority mode. The user selects a radio button indicating the mode to be selected to set the selected mode for the corresponding functional unit 20. The input-output synchronization mode 1 and the input-output synchronization mode 2 are used to set the plurality of input-output synchronization modes as described above with reference to FIG. 11.

The functional unit 20 for which any mode has been set may appear in a different color indicating the selected mode in the layout. This color display allows the user to identify the mode set for each functional unit 20 by quickly viewing the screen.

h7: Calculating Timing in Control System

The support apparatus 40 may provide the user interface screens described above to determine the target functional units 20 for which the timing to obtain a status value from a control target and the timing to update an output value for the control target are to be synchronized (more specifically, the functional units 20 for which the input-output synchronization mode is to be set). The support apparatus 40 then performs the processing described below to calculate the timing associated with the target functional units 20 for which the input-output synchronization mode is to be set.

More specifically, the support apparatus 40 obtains, for an upper data frame transferred on the field network 2 in a predetermined communication cycle, a first estimated time (the time corresponding to processing (4) in FIGS. 7 to 11), which is taken from when the PLC 1 (master device) transmits an upper data frame to when the remote IO terminal 3 (slave device) receives the upper data frame completely.

The support apparatus 40 further obtains a second estimated time (the time corresponding to processing (5) in FIGS. 7 to 11), which is taken from when the remote IO terminal 3 (slave device) receives the upper data frame completely to when each remote IO terminal 3 completely transfers data contained in the upper data frame to all the target functional units 20.

The support apparatus 40 further obtains a third estimated time (the time corresponding to processing (7) and (8) in FIGS. 7 to 11), which is taken by all the target functional units 20 included in the remote IO terminal 3 (slave device) to be ready to transmit a status value obtained from the control target via the field network 2.

The support apparatus 40 calculates, for each target functional unit 20, the timing to start obtaining a status value from the control target (IN data latch sync timing) within the communication cycle, and the timing to output data included in the received data frame to the control target (OUT data output sync timing) within the communication cycle based on the above estimated times.

In the same manner, the support apparatus 40 calculates the timing using the above estimated times as appropriate for each functional unit 20 for which the Input priority mode or the output priority mode is set.

I. Procedure

Figure 19:
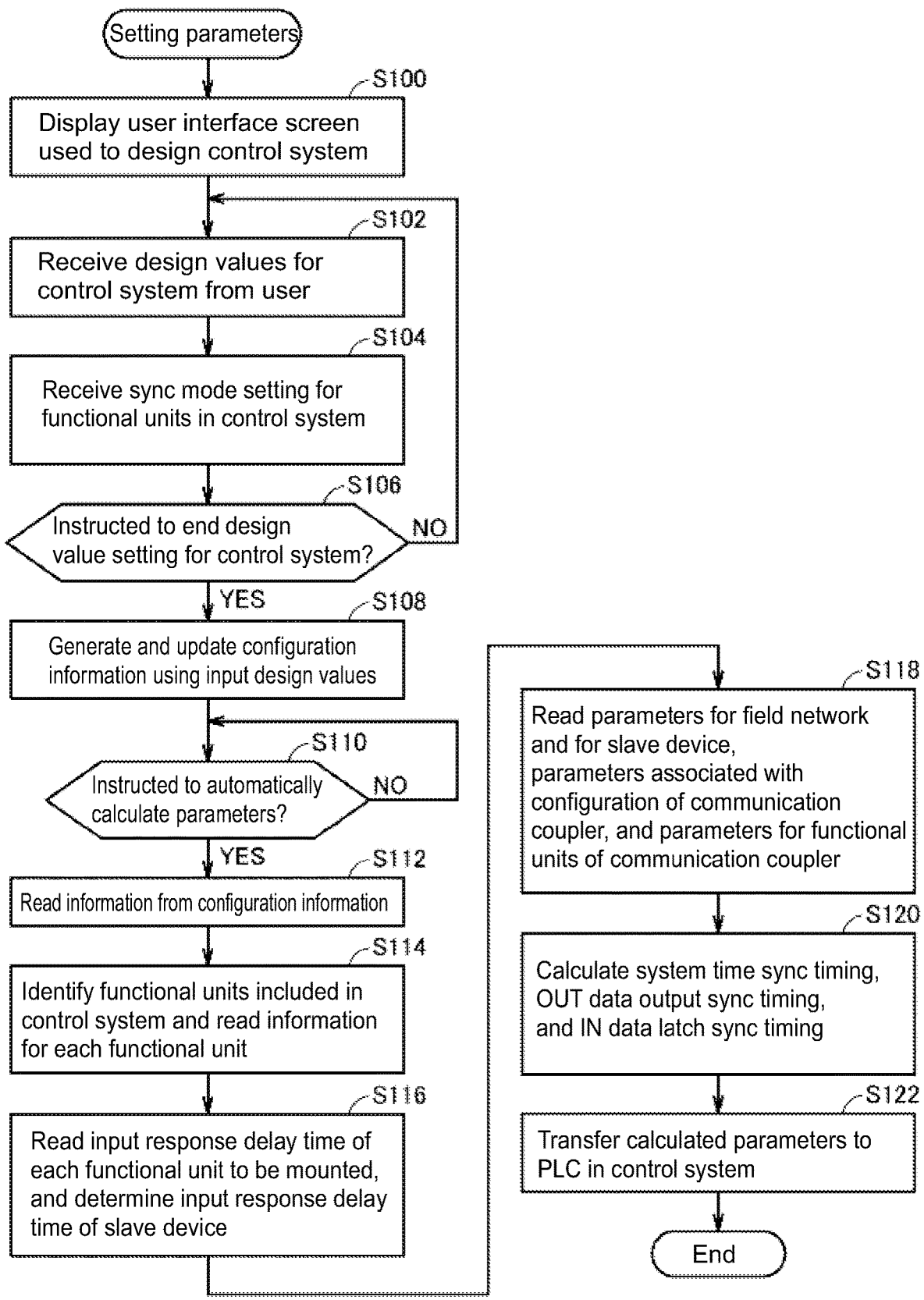
FIG. 19 is a flowchart showing a procedure for setting parameters to be used in the control system according to the embodiment of the present invention.

A procedure for setting parameters used in the control system SYS of the present embodiment using the support apparatus 40 will now be described. FIG. 19 is a flowchart showing the procedure for setting parameters used in the control system SYS of the present embodiment. The procedure shown in FIG. 19 is typically implemented by the CPU 41 included in the support apparatus 40 executing the tool program 441 (FIG. 5). The process for calculating the intended parameters may not be performed by the support apparatus 40 but may be performed by another information processing apparatus separate from the CPU module 10 included in the PLC 1 or from the support apparatus 40.

Referring now to FIG. 19, when the user instructs to execute the tool program 441, the support apparatus 40 displays the user interface screen to be used to design the control system SYS on the monitor 47 (step S100). The support apparatus 40 then receives design values for the control system SYS from the user (step S102). The design values include parameters associated with the entire control system SYS and parameters associated with each unit.

The support apparatus 40 also receives, from the user, information about the synchronizing mode setting for functional units 20 included in the control system SYS (step S104). More specifically, the support apparatus 40 receives information designating one or more target functional units 20 for which the input-output synchronization mode is to be set or information about the mode other than the input-output synchronization mode (the Input priority mode or the output priority mode) as described above with reference to FIGS. 16 to 18.

The processing in step S102 and S104 is repeated until the user instructs to end the setting of design values in the control system SYS (NO in step S106).

When the user instructs to end the setting of design values in the control system SYS (YES in step S106), the support apparatus 40 generates or updates the configuration information 442 using the design values input by the user (step S108).

When the user subsequently instructs to automatically calculate parameters (YES in step S110), the support apparatus 40 starts the processing for calculating the parameters by referring to the configuration information 442 and the device profiles 443. More specifically, the support apparatus 40 reads, from the configuration information 442, information including (1) the PLC control cycle of the CPU module 10, (2) information indicating whether the slave device is enabled or disabled, and (3) the communication cycle of an upper data frame (step S112). Subsequently, the support apparatus 40 identifies each functional unit 20 included in the control system SYS by referring to the configuration information 442. The support apparatus 40 then reads information including (a) the input response delay time, (b) the input conversion delay time, and (c) the output response delay time (refer to FIG. 14) for each functional unit 20 from the corresponding device profile 443 (step S114).

For each communication coupler 30 included in the control system SYS, the support apparatus 40 further reads, from the device profile 443, the input response delay time for each functional unit 20 to be mounted, and determines the input response delay time of each slave device based on the maximum value of the input response delay times of the functional units 20 included in the communication coupler 30 (step S116).

The support apparatus 40 further reads, from the configuration information 442, parameters associated with the field network 2 included in the control system SYS, parameters associated with slave devices, parameters associated with the configuration of each communication coupler 30, and parameters associated with the functional units 20 included in each communication coupler 30 (step S118).

Finally, the support apparatus 40 calculates the system time sync timing, the OUT data output sync timing, and the IN data latch sync timing (step S120). For the functional unit 20 for which the input priority mode or the output priority mode is set, the support apparatus 40 calculates the OUT data output sync timing or the IN data latch sync timing. The calculated values are then stored in, for example, the configuration information 442 as synchronization parameters.

More specifically, through the processing in steps S112 to S120, the support apparatus 40 calculates the parameters for the PLC 1 (master device or slave device) and the functional units 20 included in the remote IO terminal 3 (slave device) in accordance with the mode selected from the plurality of available modes.

The support apparatus 40 transfers the calculated parameters to the PLC 1 in the control system SYS (step S122). The PLC 1 then transfers parameters intended for one or more remote IO terminals 3. Through this series of operations, the control system SYS enables specific functional units 20 to operate in the input-output synchronization mode, and the other functional units 20 to operate in their designated mode (the Input priority mode or the output priority mode) or in the default mode. The support apparatus 40 sets the calculated parameters for the control system SYS.

J. Advantages

The present embodiment allows the user to selectively designate functional units 20 for which the input refresh and the output refresh are synchronized in accordance with a control target. The user can set the input priority mode or the output priority mode for the other functional units 20 as appropriate. The present embodiment thus allows synchronization of the input timing and the output timing between the functional units 20, while achieving the contradictory aspect of shortening the communication cycle of data frames transferred on the field network 2.

The present embodiment allows intended parameters to be calculated as appropriate when any mode is set. The control system SYS can thus be operated with fewer man-hours by any user who may lack technical knowledge.

The embodiments disclosed herein are only illustrative in all respects and should not be construed to be restrictive. The scope of the invention is designated by the appended claims, and it is intended that all changes are contained in the claims and equivalent meanings and ranges.

REFERENCE SIGNS LIST

1 PLC
2 field network
3 remote IO terminal
6 detection switch
7 relay
10 CPU module
11, 31 internal bus
12 power supply unit
20 functional unit
30 communication coupler
40 support apparatus
41 CPU
43 RAM
44 hard disk
45 keyboard
46 mouse
47 monitor
48 CD-ROM drive
52 CD-ROM
54 connection cable
100, 200 processor
101 nonvolatile memory
102, 209 system program
104, 442 configuration information
110 field network controller
112, 210a, 220a reception unit
114, 210b, 220b transmission unit
120 field network communication controller
122 memory controller
124, 207 memory
126, 164, 203 reception buffer
128, 166, 204 transmission buffer
130 internal bus controller
132 internal bus communication controller
142 transmission circuit
144 reception circuit
160 storage unit
162, 202 shared memory
206 IO module
208 setup information
212, 222 DES
214, 224 forward controller
216, 226 SER
230 reception processing unit
232 decoder
234 CRC checker
240 transmission processing unit
242 CRC generator
244 encoder 250 bus
311 downlink
312 uplink
441 tool program
443 device profile
SYS control system

The invention claimed is:

1. An information processing apparatus for setting parameters to be used in a control system for controlling a control target, the control system comprising a master device and one or more slave devices connected to the master device via a network, each slave device comprising a plurality of functional units, each of the plurality of functional units comprising a transmission unit configured to transmit an output value to the control target and a reception unit configured to receive a status value from the control target, the information processing apparatus comprising:

a processor configured with a program to perform operations comprising:

operation as a calculation unit configured to calculate parameters for controlling input timing of inputting the status value and output timing of outputting the output value for each of the plurality of functional units included in each slave device in accordance with a mode selected from a plurality of available modes; and operation as a setting unit configured to set the calculated parameters for each of the plurality of functional units included in each slave device in the control system, the plurality of modes comprising:

a first mode in which, in each of a plurality of control cycles, the calculated parameters are calculated such that: obtaining the respective status values from the control target by every one of the plurality of functional units begins simultaneously; and updating the respective output values for the control target by every one of the plurality of functional units completes simultaneously, wherein the updating the respective output values for the control target by every one of the plurality of functional units completes before the obtaining the respective status values from the control target by every one of the functional units begins, and a second mode in which, in each of the plurality of control cycles, the calculated parameters are calculated such that: obtaining the status values from the control target by selected ones of the plurality of functional units begins simultaneously; and updating the respective output values for the control target by the selected ones of the plurality of functional units completes simultaneously, wherein the updating the respective output values for the control target by the selected ones of the plurality of functional units completes before the obtaining the status values from the control target by the selected ones of the plurality of functional units begins.

2. The information processing apparatus according to claim 1, wherein in the second mode, obtaining the status values from the control target begins simultaneously or updating the respective output values for the control target completes simultaneously for functional units other than the selected ones of the plurality of functional units.

3. The information processing apparatus according to claim 1, wherein in the second mode, obtaining the status values from the control target by the selected ones of the plurality of functional units begins simultaneously and updating the respective output values for the control target by the selected ones of the plurality of functional units completes simultaneously, and obtaining the status values from the control target begins simultaneously and updating the respective output values for the control target completes simultaneously for functional units other than the selected ones of the plurality of functional units, independently of the selected ones of the plurality of functional units.

4. The information processing apparatus according to claim 1, the processor further configured with the program to perform operations comprising:

operation as a selection reception unit configured to receive a selection of the selected ones of the plurality of functional units.

5. The information processing apparatus according to claim 1, wherein the master device comprises a plurality of functional units configured to transmit and receive a signal to and from the control target, the processor is configured with the program to perform operations further comprising operation as the calculation unit configured to calculate parameters for controlling input timing of inputting the status value and output timing of outputting the output value for the plurality of functional units of the master device in accordance with the mode selected from the plurality of modes, wherein the plurality of modes further comprises:

a first mode in which the calculated parameters are calculated such that: obtaining respective status values from the control target by every one of the plurality of the functional units of the master device begins simultaneously; and updating respective output values for the control target by every one of the plurality of functional units of the master device completes simultaneously, and a second mode in which the calculated parameters are calculated such that: obtaining the respective status values from the control target by selected ones of the plurality of functional units of the master device begins simultaneously; and updating the respective output values for the control target by the selected ones of the plurality of functional units of the master device completes simultaneously.

6. The information processing apparatus according to claim 1, wherein the processor is further configured with the program to perform operations further comprising:

operation as an identification unit configured to identify the selected ones of the plurality of functional units, operation as a first obtaining unit configured to obtain a first estimated time for a data frame transmitted on the network in a predetermined communication cycle, the first estimated time being a time from when the master device transmits the data frame to when the slave device completely receives the data frame, operation as a second obtaining unit configured to obtain a second estimated time, the second estimated time being a time from when the slave device completely receives the data frame to when the slave device completely transfers data included in the received data frame to all the selected ones of the plurality of functional units, operation as a third obtaining unit configured to obtain a third estimated time, the third estimated time being a time by all the selected ones of the plurality of functional units included in the slave device to be ready to transmit a status value obtained from the control target via the network; and operation as a determination unit configured to determine, for each of the selected ones of the plurality of functional units, a time at which obtaining the status value from the control target within the communication cycle is started and a time at which the data included in the received data frame is output to the control target within the communication cycle based on the first estimated time, the second estimated time and the third estimated time.

7. A non-transitory computer-readable medium storing instructions which, when executed, enable a computer to perform processing for setting parameters to be used in a control system for controlling a control target, the control system comprising a master device and one or more slave devices connected to the master device via a network, each slave device comprising a plurality of functional units, each functional unit comprising a transmission unit configured to transmit an output value to the control target and a reception unit configured to receive a status value from the control target, the processing comprising:

calculating parameters for controlling input timing of inputting the status value and output timing of outputting the output value for each of the plurality of functional units included in each slave device in accordance with a mode selected from a plurality of available modes; and setting the calculated parameters in the control system, the plurality of modes comprising:

a first mode in which, in each of a plurality of control cycles, the calculated parameters are calculated such that: obtaining the respective status values from the control target by every one of the plurality of functional units begins simultaneously; and updating the respective output values for the control target by every one of the plurality of functional units completes simultaneously, wherein the updating the respective output values for the control target by every one of the plurality of functional units completes before the obtaining the respective status values from the control target by every one of the functional units begins, and a second mode in which, in each of the plurality of control cycles, the calculated parameters are calculated such that: obtaining the status values from the control target by selected ones of the plurality of functional units begins simultaneously; and updating the respective output values for the control target by the selected ones of the plurality of functional units completes simultaneously, wherein the updating the respective output values for the control target by the selected ones of the plurality of functional units completes before the obtaining the status values from the control target by the selected ones of the plurality of functional units begins.

8. An information processing method for setting parameters to be used in a control system for controlling a control target, the control system comprising a master device and one or more slave devices connected to the master device via a network, each slave device comprising a plurality of functional units, each functional unit comprising a transmission unit configured to transmit an output value to the control target and a reception unit configured to receive a status value from the control target, the information processing method comprising:

calculating parameters for controlling input timing of inputting the status value and output timing of outputting the output value for each of the plurality of functional units included in each slave device in accordance with a mode selected from a plurality of available modes; and setting the calculated parameters in the control system, the plurality of modes comprising:

a first mode in which the calculated parameters are calculated such that: obtaining the respective status values from the control target by every one of the plurality of functional units begins simultaneously; and updating the respective output values for the control target by every one of the plurality of functional units completes simultaneously, wherein the updating the respective output values for the control target by every one of the plurality of functional units completes before the obtaining the respective status values from the control target by every one of the functional units begins, and a second mode in which the calculated parameters are calculated such that: obtaining the status values from the control target by selected ones of the plurality of functional units begins simultaneously; and updating the respective output values for the control target by the selected ones of the plurality of functional units completes simultaneously, wherein the updating the respective output values for the control target by the selected ones of the plurality of functional units completes before the obtaining the status values from the control target by the selected ones of the plurality of functional units begins.

9. The information processing method according to claim 8, wherein in the second mode, obtaining the status values from the control target begins simultaneously or updating the respective output values for the control target completes simultaneously for functional units other than the selected ones of the plurality of functional units.

10. The information processing method according to claim 8, wherein in the second mode, obtaining the status values from the control target by the selected ones of the plurality of functional units begins simultaneously and updating the respective output values for the control target by the selected ones of the plurality of functional units completes simultaneously, and obtaining the status values from the control target begins simultaneously and updating the respective output values for the control target completes simultaneously for functional units other than the selected ones of the plurality of functional units, independently of the selected ones of the plurality of functional units.

11. The information processing method according to claim 8, wherein the control system comprises a selection reception unit, the method further comprising receiving, via the selection reception unit, a selection of the selected ones of the plurality of functional units.

12. The information processing method according to claim 8, wherein the master device comprises a plurality of functional units configured to transmit and receive a signal to and from the control target, the method further comprises calculating parameters for controlling input timing of inputting the status value and output timing of outputting the output value for the plurality of functional units of the master device in accordance with the mode selected from the plurality of modes, wherein the plurality of modes further comprises:

a first mode in which the calculated parameters are calculated such that: obtaining respective status values from the control target by every one of the plurality of the functional units of the master device begins simultaneously; and updating respective output values for the control target by every one of the plurality of functional units of the master device completes simultaneously, and a second mode in which the calculated parameters are calculated such that: obtaining the respective status values the control target by selected ones of the plurality of functional units of the master device begins simultaneously; and updating the respective output values for the control target by the selected ones of the plurality of functional units of the master device completes simultaneously.

13. The information processing method according to claim 8, wherein the control system further comprises an identification unit, a first obtaining unit, a second obtaining unit, a third obtaining unit, and a determination unit, the method further comprising:

identifying, via the identification unit, the selected ones of the plurality of functional units, obtaining, via the first obtaining unit, a first estimated time for a data frame transmitted on the network in a predetermined communication cycle, the first estimated time being a time from when the master device transmits the data frame to when the slave device completely receives the data frame, obtaining, via the second obtaining unit, a second estimated time, the second estimated time being a time from when the slave device completely receives the data frame to when the slave device completely transfers data included in the received data frame to all the selected ones of the plurality of functional units, obtaining, via the third obtaining unit, a third estimated time, the third estimated time being a time taken by all the selected ones of the plurality of functional units to be ready to transmit a status value obtained from the control target via the network, and determining, via the determination unit, for each of the selected ones of the plurality of functional units, a time at which obtaining the status value from the control target within the communication cycle is started and a time at which the data included in the received data frame is output to the control target within the communication cycle based on the first estimated time, the second estimated time and the third estimated time.

* * * * *